US010992592B2

(12) United States Patent
Fukuda et al.

(10) Patent No.: US 10,992,592 B2
(45) Date of Patent: Apr. 27, 2021

(54) INFORMATION PROCESSING DEVICE, INFORMATION PROCESSING METHOD, PROGRAM, STORAGE MEDIUM, AND INFORMATION PROCESSING SYSTEM PREVENTING EXHAUSTION OF A LIMIT ON A USER'S DATA PLAN

(71) Applicant: Rakuten, Inc., Tokyo (JP)

(72) Inventors: Eiji Fukuda, Tokyo (JP); Hirohisa Tanigawa, Tokyo (JP)

(73) Assignee: Rakuten, Inc., Tokyo (JP)

( * ) Notice: Subject to any disclaimer, the term of this patent is extended or adjusted under 35 U.S.C. 154(b) by 112 days.

(21) Appl. No.: 16/097,877

(22) PCT Filed: May 13, 2016

(86) PCT No.: PCT/JP2016/064344
§ 371 (c)(1),
(2) Date: Mar. 21, 2019

(87) PCT Pub. No.: WO2017/195361
PCT Pub. Date: Nov. 16, 2017

(65) Prior Publication Data
US 2019/0207865 A1 Jul. 4, 2019

(51) Int. Cl.
*H04L 12/911* (2013.01)
*G06Q 50/10* (2012.01)

(52) U.S. Cl.
CPC ........... *H04L 47/70* (2013.01); *G06Q 50/10* (2013.01)

(58) Field of Classification Search
CPC ................. H04L 47/70; H04N 21/2402; H04N 21/2407; H04N 21/812; G06Q 50/10
See application file for complete search history.

(56) References Cited

U.S. PATENT DOCUMENTS

| | | | |
|---|---|---|---|
| 9,432,266 B2* | 8/2016 | Li | H04L 67/322 |
| 9,723,092 B1* | 8/2017 | Kashanian | H04L 63/10 |
| 9,923,953 B2* | 3/2018 | Doumet | H04L 67/10 |
| 10,643,239 B2* | 5/2020 | Login | G06Q 30/0251 |
| 2010/0017506 A1* | 1/2010 | Fadell | H04L 43/0876 709/224 |
| 2012/0084232 A1 | 4/2012 | Kurabayashi et al. | |
| 2012/0108200 A1* | 5/2012 | Rubin | H04W 28/10 455/405 |
| 2012/0317246 A1 | 12/2012 | Hickmott et al. | |
| 2013/0203433 A1 | 8/2013 | Luna et al. | |

(Continued)

FOREIGN PATENT DOCUMENTS

| | | |
|---|---|---|
| JP | 2003085451 A | 3/2003 |
| JP | 2013-197704 A | 9/2013 |

(Continued)

OTHER PUBLICATIONS

International Search Report & Written Opinion of the ISA for PCT/JP2016/064344 dated Jul. 5, 2016.

*Primary Examiner* — Mohamed A. Wasel
(74) *Attorney, Agent, or Firm* — Sughrue Mion, PLLC

(57) ABSTRACT

Methods and systems related to identifying whether a user terminal is in a state of using network communication associated with a data plan or not, and selecting a content to be distributed when the terminal is identified as not being in the state of using the network communication associated with the data plan.

13 Claims, 14 Drawing Sheets

(56) References Cited

U.S. PATENT DOCUMENTS

2014/0258469 A1* 9/2014 Maharajh .............. G06Q 10/10
                                                    709/219
2015/0120458 A1   4/2015 Lee et al.
2015/0215816 A1* 7/2015 Abou-Elkheir ..... H04L 67/2847
                                                    370/230

FOREIGN PATENT DOCUMENTS

| JP | 2013196159 A    | 9/2013 |
|----|-----------------|--------|
| JP | 2015520903      | 7/2015 |
| JP | 2016046584 A    | 4/2016 |
| KR | 10-2012-0048930 A | 5/2012 |
| WO | 2012046286 A1   | 4/2012 |

* cited by examiner

FIG. 4

TERMINAL DB 51

| TERMINAL ID | USER ID | COMMUNICATION CAPACITY LIMIT VALUE | DETERMINATION TARGET PERIOD LENGTH | INTERMEDIATE DETERMINATION PERIOD LENGTH | START TIME | REMAINING COMMUNICATION AMOUNT | AVERAGE USED COMMUNICATION AMOUNT | THRESHOLD VALUE | DISTRIBUTION CONTROL STATE |
|---|---|---|---|---|---|---|---|---|---|
| D_00001 | U_32819 | 3Gbyte | ONE MONTH | 10 DAYS | 1ST DAY OF EACH MONTH | 1.2Gbyte | 80Mbyte/day | 200Mbyte | NORMAL STATE |
| D_00002 | U_00335 | 2Gbyte | ONE MONTH | ONE WEEK | 1ST DAY OF EACH MONTH | 0.8Gbyte | 60Mbyte/day | — | LIMIT-REQUIRING STATE |
| D_00003 | U_01007 | — | — | — | — | — | — | — | — |
| ... | ... | ... | ... | ... | ... | ... | ... | ... | ... |

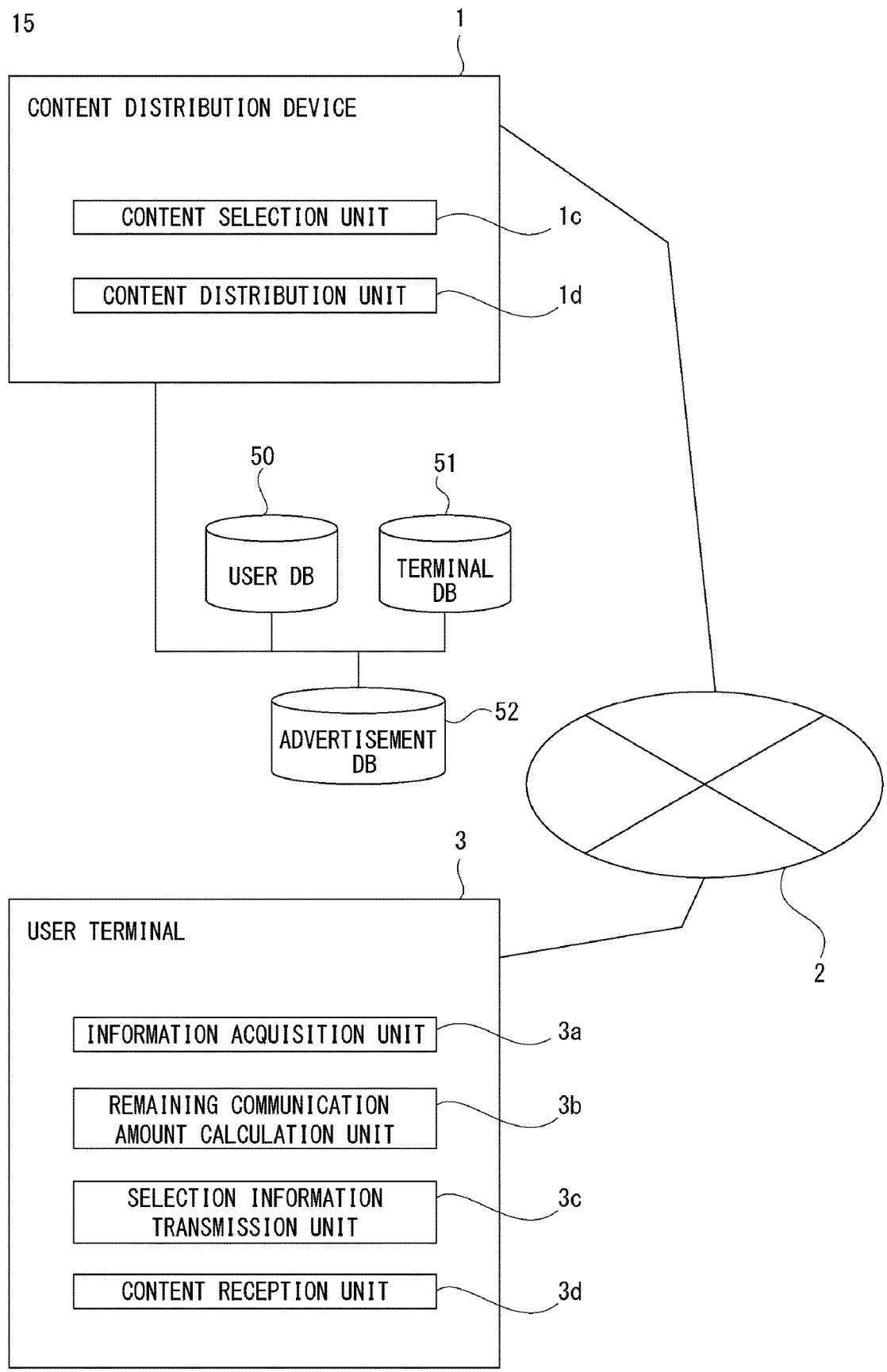

INFORMATION PROCESSING DEVICE, INFORMATION PROCESSING METHOD, PROGRAM, STORAGE MEDIUM, AND INFORMATION PROCESSING SYSTEM PREVENTING EXHAUSTION OF A LIMIT ON A USER'S DATA PLAN

CROSS REFERENCE TO RELATED APPLICATIONS

This application is a National Stage of International Application No. PCT/JP2016/064344 filed May 13, 2016.

TECHNICAL FIELD

The present invention relates to an information processing device, an information processing method, a program, a storage medium, and an information processing system. More specifically, the present invention relates to a technology for performing content distribution according to a communication speed of a user.

CITATION LIST

Patent Literature

PTL1: JP2003-085451A

BACKGROUND ART

The development of communication networks such as the internet has ushered in the establishment of an environment for performing high-speed communication. In this environment, companies which provide communication services are now providing users with various communication plans.

Examples of such plans include a communication plan in which charges are established according to the amount of communication that was used, a communication plan in which a fixed amount is charged regardless of the amount of communication that was used, and the like.

Further, as one embodiment of a fixed-fee communication plan in which a fixed amount is charged, there is a communication plan in which the communication becomes low-speed upon surpassing a predetermined amount of communication.

Distributors that distribute various information such as advertisements to users utilizing such a communication plan may select the distribution content upon confirming that the communication has become low-speed. For example, PTL1 discloses a technology for "defining the quality of content based on a frame number or data amount per unit time received by a reception terminal". According to this technology, distribution content which does not contain a large amount of information can be selected when the communication has become low-speed.

SUMMARY OF INVENTION

Technical Problem

However, even if a distribution content which does not contain a large amount of information is selected after it has been confirmed that the communication has become low-speed, the user is still forced to use low-speed communication for any subsequent communication.

If subsequent communication becomes low-speed upon exceeding a communication capacity limit value, within which high-speed communication is secured, due to communication (communication performed by periodic advertisement distribution, etc.) different from communication that is actively carried out by the user (for example, communication performed by the user viewing a webpage or downloading software by his/her own operation), the user may be left with an unpleasant feeling.

Thus, considering the above circumstances, an object of the present invention is to provide a content distribution service that takes into account a communication capacity limit value of a communication plan used by a user.

Solution to Problem

An information processing device according to the present invention includes: a communication capacity limit management unit that manages a communication capacity limit value of a terminal to which a content is to be distributed, and a determination target period which is a period during which a used communication capacity is determined; a remaining communication amount calculation unit that calculates, on the basis of the communication capacity limit value, a remaining communication amount in the determination target period; a content selection unit that selects a content to be distributed according to the remaining communication amount; and a content distribution unit that distributes the selected content to the terminal.

Due to the above configuration, a distribution content is selected and transmitted according to the remaining communication amount for each terminal.

The above-described information processing device preferably further includes a state determination unit that determines a state in which the remaining communication amount is less than a threshold value to be a limit-requiring state, and determines a state in which the remaining communication amount is at or above the threshold value to be a normal state, and the content selection unit preferably selects a content using the result of this determination.

The process for comparing the remaining communication amount and the threshold value may be realized by a simple process with a low processing load.

The communication capacity limit management unit of the above-described information processing device preferably manages a period shorter than the determination target period as an intermediate determination period, and the state determination unit preferably performs the determination using the threshold value as an intermediate threshold value, which can be calculated from a value obtained by multiplying a ratio of a length of the intermediate determination period relative to a length of the determination target period by the communication capacity limit value, and using the remaining communication amount at an intermediate point at which the intermediate determination period has elapsed from a start of the determination target period.

Due to the above configuration, it is determined whether the state is the limit-requiring state or the normal state by comparing the remaining communication amount and the intermediate threshold value at the time at which the intermediate determination period has elapsed.

The above-described information processing device preferably further includes: a remaining time calculation unit that calculates a remaining time of the determination target period; a predicted remaining communication amount calculation unit that calculates, on the basis of a communication capacity that is used on average in the terminal, a predicted remaining communication amount at the time of completion of the determination target period; and a state determination unit that determines a normal state and a limit-requiring state according to the predicted remaining communication amount.

Due to the above configuration, a predicted remaining communication amount reflecting the individual usage state is calculated on the basis of the average used communication amount for each terminal. The predicted remaining communication amount is a numerical value predicting how much communication will be remaining at the time of completion of the determination target period, and an information amount of a content which can be distributed is estimated based on this numerical value.

The communication capacity limit management unit of the above-described information processing device preferably updates, each time the content distribution is performed, information of the communication capacity limit value and the determination target period, using a distribution time, which is a time required for the content distribution, and an information amount of the content.

Due to the above configuration, information of the communication capacity limit value and the determination target period is updated for each content distribution.

The content distribution unit of the above-described information processing device preferably does not distribute a content to the terminal in the limit-requiring state.

Due to the above configuration, in the limit-requiring state, the remaining communication amount is not consumed by a distributed content.

The content distribution unit of the above-described information processing device preferably distributes a content to the terminal even in the limit-requiring state if the terminal is in a state in which remaining communication amount non-use communication, which does not use the remaining communication amount, is established.

Due to the above configuration, the content is distributed even in the limit-requiring state if the terminal is in a state in which the remaining communication amount is not used (is not consumed).

The communication capacity limit management unit of the above-described information processing device preferably makes a user using the terminal input at least one of the communication capacity limit value, a period length of the determination target period, and a start time of the determination target period.

Due to the above configuration, at least one of the communication capacity limit value, a period length of the determination target period, and a start time of the determination target period can be managed as reliable information on the basis of the information input by the user.

The content selection unit of the above-described information processing device preferably, in the case that a first content and a second content having a smaller information amount than the first content are provided as contents comprising identical content to be distributed to the terminal, selects the first content in the normal state and selects the second content in the limit-requiring state.

Due to the above configuration, in the case that two contents of different information amounts are provided as contents comprising identical content, the content is selected according to the remaining communication amount of the user or the like.

The content to be handled by the above-described information processing device is preferably a content that is displayed on a screen when restoring the terminal in a sleep mode to a normal mode.

Due to the above configuration, for example, the content is displayed on the screen of a portable terminal in a state in which the terminal is not being used by a user. Further, the content is definitely viewed when the user uses the portable terminal.

Further, an information processing device according to the present invention may include: an information acquisition unit that acquires information of a communication capacity limit value and information of a determination target period, which is a period during which a used communication capacity is determined; a remaining communication amount calculation unit that calculates, on the basis of the communication capacity limit value, a remaining communication amount in the determination target period; a selection information transmission unit that transmits selection information for selecting a content according to the remaining communication amount; and a content reception unit that receives the content selected on the basis of the selection information.

Due to the above configuration, a distribution content selected according to the remaining communication amount for each terminal is received.

An information processing method according to the present invention includes the following steps executed by an information processing device: a communication capacity limit management step of managing a communication capacity limit value of a terminal to which a content is to be distributed, and a determination target period which is a period during which a used communication capacity is determined; a remaining communication amount calculation step of calculating, on the basis of the communication capacity limit value, a remaining communication amount in the determination target period; a content selection step of selecting a content to be distributed according to the remaining communication amount; and a content distribution step of distributing the selected content to the terminal.

According to the above-described information processing method, a process is executed for providing an environment in which a content distribution service that takes into account a communication capacity limit value of a communication plan used by a user can be provided.

Further, an information processing method according to the present invention may include the following steps executed by an information processing device: an information acquisition step of acquiring information of a communication capacity limit value and information of a determination target period, which is a period during which a used communication capacity is determined; a remaining communication amount calculation step of calculating, on the basis of the communication capacity limit value, a remaining communication amount in the determination target period; a selection information transmission step of transmitting selection information for selecting a content according to the remaining communication amount; and a content reception step of receiving the content selected on the basis of the selection information.

According to the above-described information processing method, a process is executed for using a content distribution service that takes into account a communication capacity limit value of a communication plan used by a user.

A program according to the present invention causes an arithmetic processing device to execute a process to be executed as the information processing method.

A storage medium according to the present invention stores the program.

An information processing system according to the present invention includes a server and a terminal, and further includes: a communication capacity limit management unit that manages a communication capacity limit value of the terminal to which a content is to be distributed, and a determination target period which is a period during which a used communication capacity is determined; a remaining communication amount calculation unit that calculates, on the basis of the communication capacity limit value, a remaining communication amount in the determination target period; a content selection unit that selects a content to be distributed according to the remaining communication amount; and a content distribution unit that distributes the selected content to the terminal.

Advantageous Effects of Invention

According to the present invention, a content distribution service that takes into account a communication capacity limit value of a communication plan used by a user can be provided.

BRIEF DESCRIPTION OF DRAWINGS

FIG. 4 illustrates one example of information stored in a terminal DB.

FIG. 15 is a block diagram of a different embodiment of the content distribution device and the user terminal.

DESCRIPTION OF EMBODIMENTS

In the present embodiment, a service for distributing an advertisement will be explained as an example of a content distribution service. Further, a content distribution device 1 will be explained as an example of an information processing device. The content distribution device 1 includes a function as a server.

The embodiments shall be explained below in the following order.
<1. Overall Configuration>
<2. Hardware Configuration>
<3. DB>
[3-1. User DB]
[3-2. Terminal DB]
[3-3. Advertisement DB]
<4. Advertisement Display Mode>
<5. Process of User Terminal>
<6. Process of Content Distribution Device>
[6-1. First Example of Detailed Advertisement Distribution Process]
[6-2. Second Example of Detailed Advertisement Distribution Process]
[6-3. First Example of User Information Update Process]
[6-4. Second Example of User Information Update Process]
[6-5. Communication Plan Information Acquisition Process]
[6-6. Content Selection Process]
[6-7. Intermediate State Determination Process]
<7. Alternative Embodiments>
<8. Conclusion>
<9. Program>

1. OVERALL CONFIGURATION

The overall configuration of a network system including the content distribution device 1 according to the present embodiment will be explained below referring to FIGS. 1 and 2.

Figure 1:
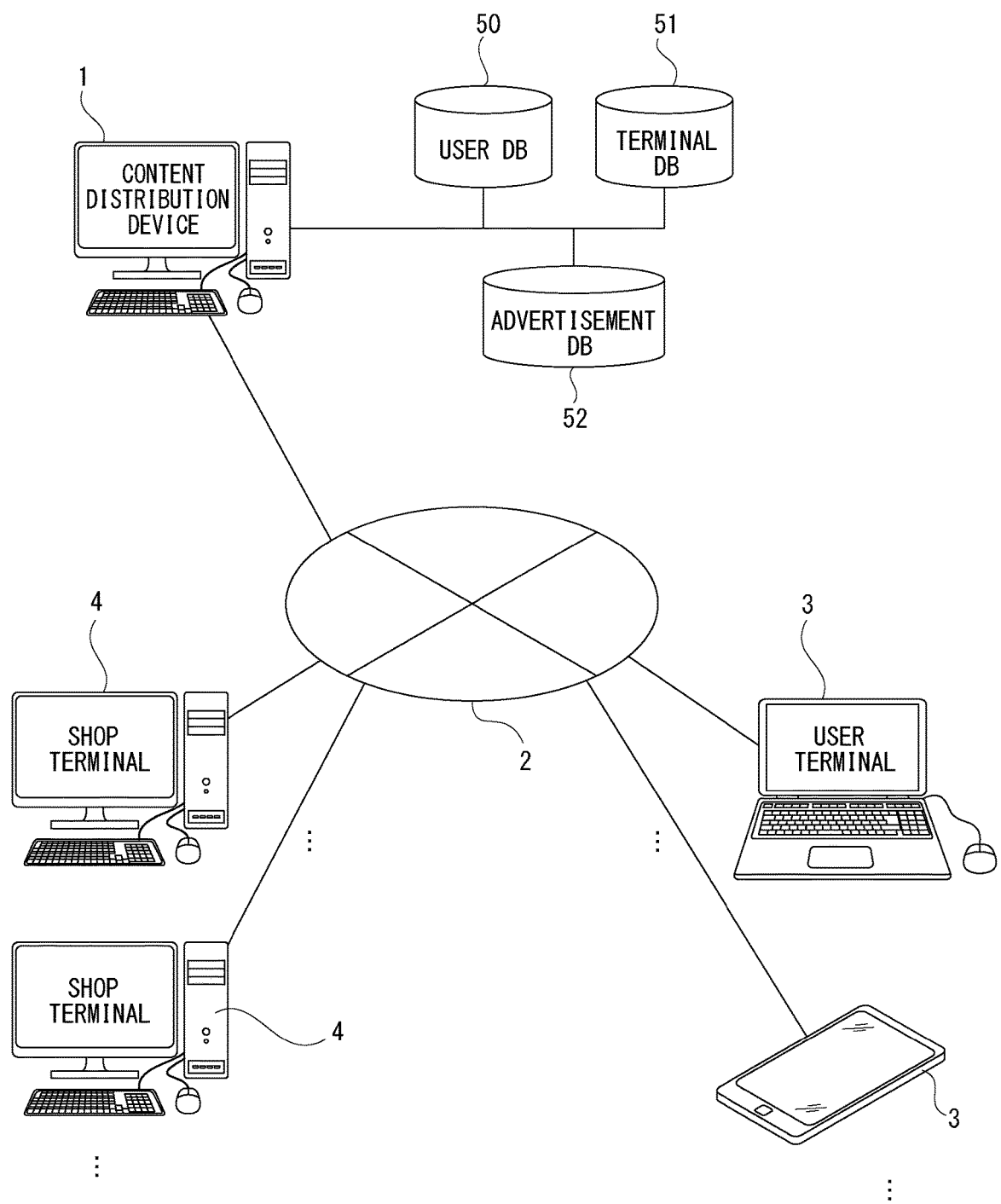
FIG. 1 illustrates the overall configuration of an embodiment of the present invention.
Figure 2:
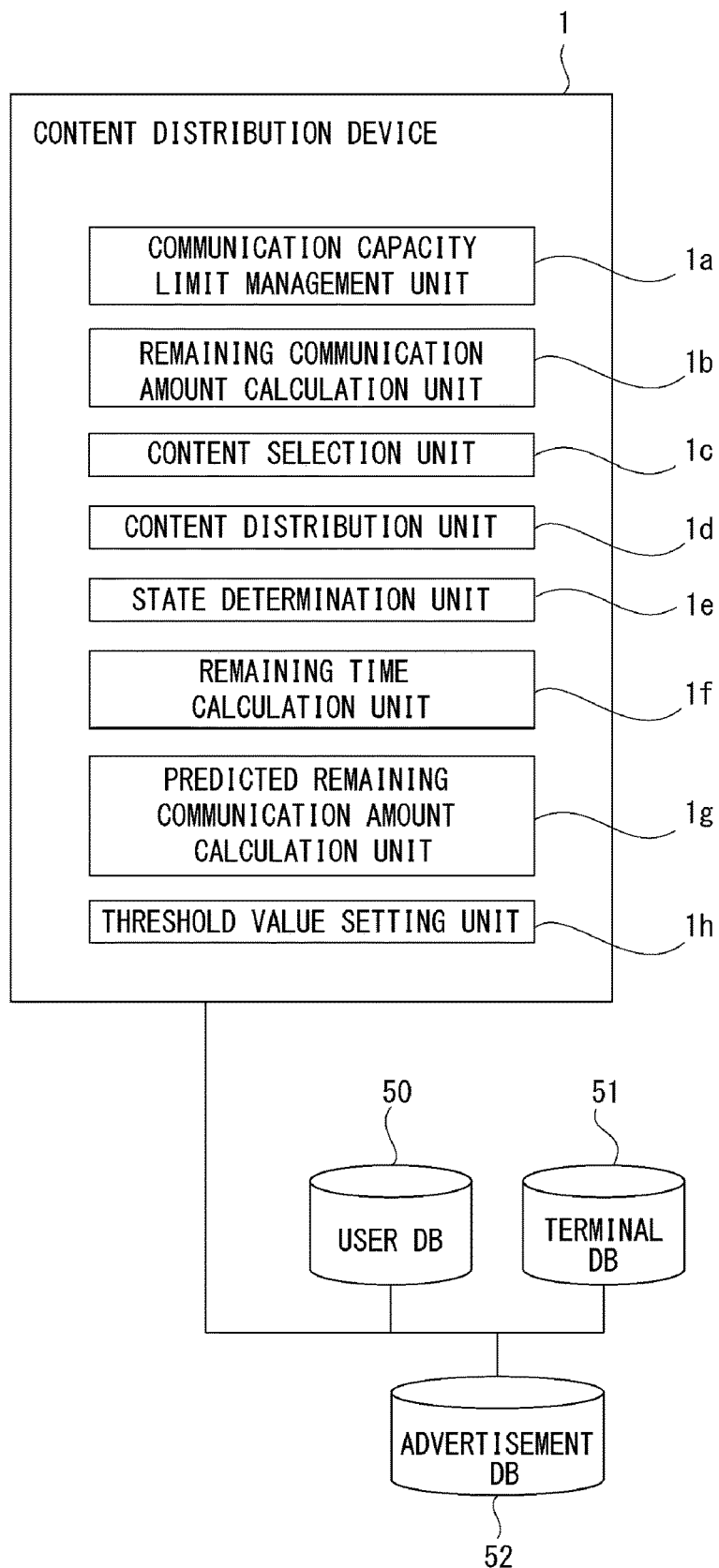
FIG. 2 is a block diagram of a content distribution device of the present embodiment.

As shown in FIG. 1, the content distribution device 1 of the present embodiment is connected via a communication network 2 to user terminals 3, 3, 3 . . . , which are used by users who are the targets of advertisement distribution, and to shop terminals 4, 4, 4 . . . , which are used by persons involved with stores that request advertisement distribution (hereinafter referred to as "distribution requesters") in a state in which mutual communication therebetween is possible.

The content distribution device 1 is an information processing device that distributes an advertisement requested by a distribution requester to a user who is the target of distribution. In order to do so, the content distribution device 1 is equipped with various functions.

For example, the content distribution device 1 is equipped with a function to generate webpage data for displaying various webpages on the user terminals 3 and the shop terminals 4, and a function to transmit the webpage data.

The webpage data is a structured document file such as HTML (Hyper Text Markup Language) and XHTML (Extensible HyperText Markup Language). In the structured document file, text data such as an item explanation and image data such as an item image as well as the arrangement and display modes thereof (character color, font, size, decoration, etc.) are described.

As the webpage, mention may be made of, for example, a login page where a user or a distribution requester inputs login information, and a webpage for inputting advertisement content.

The content distribution device 1 is equipped with various functions for receiving compensation from a distribution requester when an advertisement has been distributed to a user. In the case that consideration is to be imparted to the user once the user has viewed an advertisement, the content distribution device 1 is also equipped with a function related to this imparting.

The content distribution device 1 also includes the characteristic units of the present invention. These units will be explained below.

The configuration of the communication network 2 is not particularly limited, and the communication network 2 may be, for example, internet, intranet, extranet, LAN (Local Area Network), CATV (Community Antenna TeleVision) network, a Virtual Private Network, a telephone line network, a mobile communication network, and a satellite communication network.

Various examples can also be envisioned for the transmission medium that constitutes all or part of the communication network 2. For example, wired media such as IEEE (Institute of Electrical and Electronics Engineers) 1394, USB (Universal Serial Bus), power line carrier, and telephone line, as well as wireless media such as infrared such as IrDA (Infrared Data Association), Bluetooth (registered trademark), 802.11 wireless, mobile telephone network, satellite channel, and terrestrial digital network may be used.

Each user terminal 3 is used by a user that receives an advertisement distributed by the content distribution device 1. Further, the user terminals 3 of the present embodiment perform network communication via the communication network 2 according to a communication plan set by a company which provides a communication service.

In a communication plan, a communication capacity limit value and a period length and start time of a determination target period are set.

The communication capacity limit value represents a communication capacity for which high-speed communication can be utilized. For example, if the communication capacity limit value is 5 Gbytes (Gigabytes), high-speed communication can be utilized until the communication amount via the communication network 2 exceeds 5 Gbytes. Once the communication amount exceeds 5 Gbytes, low-speed communication is utilized. High-speed communication and low-speed communication are distinguished by a relative difference in the communication speed. For example, high-speed communication and low-speed communication may be regarded as types of communication having a different speed due to a difference in the communication system, or communication resulting from a company providing a speed limitation to high-speed communication may be referred to as low-speed communication.

The determination target period is a period for determining whether the communication amount which has been used has exceeded a communication amount of high-speed communication via the communication network 2 that is permitted in the communication plan. For example, if high-speed communication is permitted in a range in which the communication amount does not exceed 5 Gbytes in one month, then "one month" is the period length of the determination target period. In the following, the period length of the determination target period will be referred to as the "determination target period length".

The start time of the determination target period is information of a time at which the determination target period begins, and is set according to the determination target period. For example, if the determination target period length is set to one month, the start time is set to "12:00 AM on the first day of each month" or "8:00 AM on the 10th day of each month", etc. In this case, when the time becomes 12:00 AM on the first day of each month or 8:00 AM on the 10th day of each month, the communication capacity that had been accumulating becomes 0 (is reset). Further, if the determination target period length is set to "one week", the start time is set to "12:00 AM on Monday of each week" or "12:00 AM on Sunday of each week", etc. In the following, the start time of the determination target period will be simply referred to as the "start time".

If a pre-paid communication plan is used, for example, high-speed communication and low-speed communication are permitted from the start time for only the determination target period length, and once the determination target period length has elapsed, all communication utilizing the pre-paid communication plan becomes impossible. At this time, the communication capacity that had been accumulating does not have to be reset.

Each shop terminal 4 is a terminal used by a distribution requester who performs advertisement distribution using a content distribution service provided by the content distribution device 1.

In the user terminals 3 and the shop terminals 4, various transmission/reception processes and display processes and the like are executed as necessary. Further, the user terminals 3 and the shop terminals 4 are, for example, a PC (Personal Computer), a feature phone, a PDA (Personal Digital Assistant), or a smart device such as a smart phone or tablet terminal that is equipped with a communication function.

The units of the content distribution device 1 will now be explained referring to FIG. 2.

The content distribution device 1 includes: a communication capacity limit management unit 1a; a remaining communication amount calculation unit 1b; a content selection unit 1c; a content distribution unit 1d; a state determination unit 1e; a remaining time calculation unit 1f; a predicted remaining communication amount calculation unit 1g; and a threshold value setting unit 1h.

The communication capacity limit management unit 1a performs a process for managing various information of the communication plan to be applied to the user terminal 3 used by a user who is the target of advertisement distribution. The various information includes information of the communication capacity limit value, the determination target period length, and the start time explained above.

Further, a prescribed period length that is shorter than the determination target period is managed as necessary as an intermediate determination period length for each user terminal 3. The intermediate determination period length serving as the prescribed period length will be explained below with concrete examples.

The remaining communication amount calculation unit 1b executes a process for calculating the remaining communication amount in the determination target period, i.e. a process for calculating the remaining communication amount for high-speed communication which can be utilized until the accumulated communication capacity is reset.

The content selection unit 1c executes a process for selecting an advertisement serving as a content according to the remaining communication amount.

The content distribution unit 1d executes a process for distributing the selected advertisement to the user terminal 3. Further, the content distribution unit 1d also performs control so that the selected advertisement is not distributed depending on the condition of the remaining communication amount of the user terminal 3. This will be explained in detail below.

The state determination unit 1e executes a process for determining the state of the user terminal 3 according to the remaining communication amount of the user terminal 3. The state of the user terminal 3 is, for example, a "limit-requiring state" in which it is necessary to limit the distribution of content, a "normal state" in which it is not necessary to limit the distribution of content, and the like.

The information of these various states is used when the above-mentioned content selection unit 1d distributes an advertisement or the like.

In the following explanations, the state of the user terminal 3 will be referred to as the "distribution control state".

The remaining time calculation unit if executes a process for calculating the time remaining (number of days remaining) until completion of the determination target period. In the following, the time remaining until completion of the determination target period will be referred to as the "remaining time".

The predicted remaining communication amount calculation unit $1g$ executes a process for calculating a predicted value of the remaining communication amount at the time of completion of the determination target period of the user terminal 3. This process uses information of an average value of the amount of communication (for example, 150 Mbytes per day, etc.) that is used in the user terminal 3.

The threshold value setting unit $1h$ executes a process for setting a threshold value with respect to the remaining communication amount for determining the distribution control state of the user terminal 3.

Further, in the case that the determination target period length has been acquired or presumed by a process to be explained below or the like, the threshold value setting unit $1h$ calculates and sets, as an intermediate threshold value, a threshold value for an intermediate determination period length which is shorter than the determination target period length. Specifically, for example, if the determination target period length is presumed to be "one month", then "15 days" or "two weeks", which is a period that is approximately half of the determination target period length, is set as the intermediate determination period length, and if the communication capacity limit value in the determination target period length is "2 Gbytes", then an intermediate threshold value ("1 Gbyte" or a value obtained by multiplying "1 Gbyte" by a coefficient) in the intermediate determination period length ("15 days" or "two weeks") is set. The intermediate threshold value is calculated so that the communication capacity limit value is not used up before the determination target period elapses.

In addition to the units indicated above, the content distribution device 1 also includes units for realizing various functions for distributing an advertisement as a content.

In order to provide these various functions, the content distribution device 1 manages a user DB (Database) 50 in which user information is stored, a terminal DB 51 in which information of a terminal that is used by a user is stored, and an advertisement DB 52 in which advertisement information is stored.

2. HARDWARE CONFIGURATION

Figure 3:
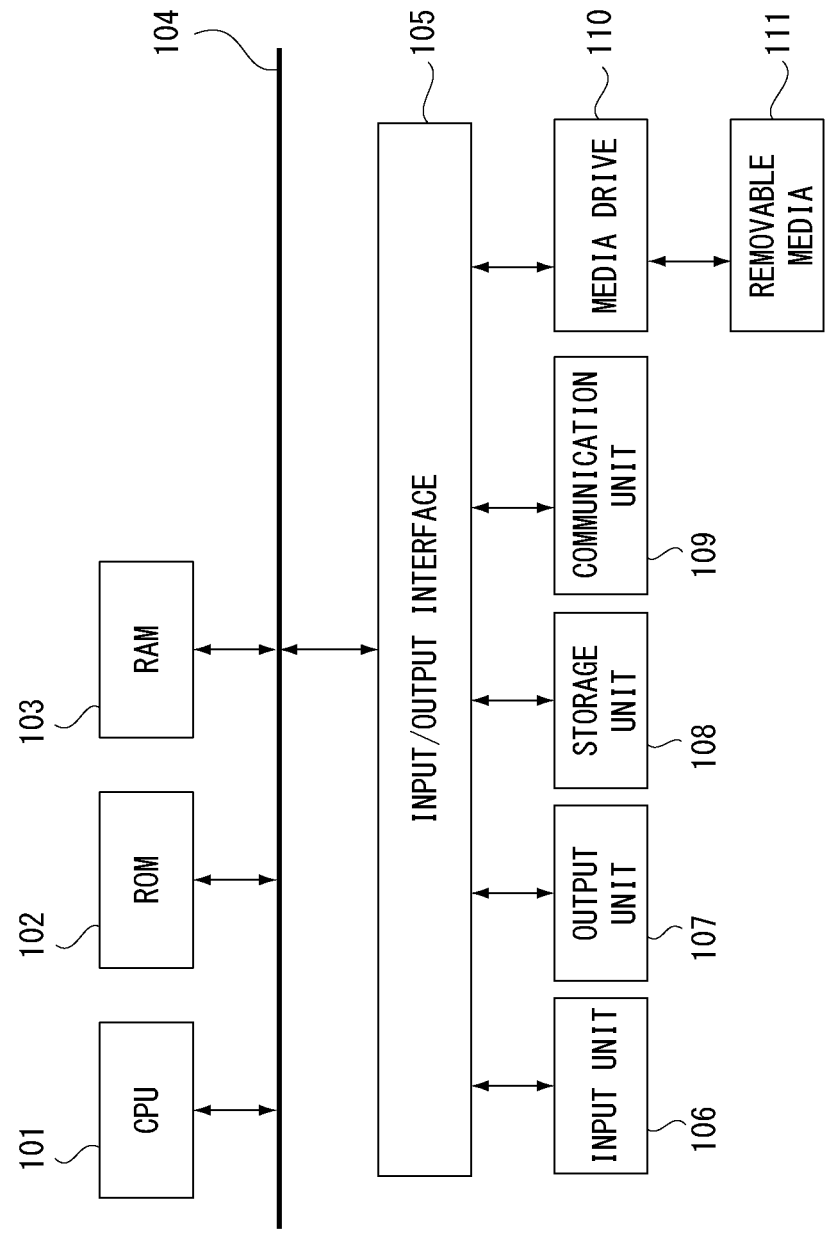
FIG. 3 is a block diagram of a computer of the present embodiment.

FIG. 3 illustrates an example of the hardware of the content distribution device 1, the user terminals 3, the shop terminals 4, the user DB 50, the terminal DB 51, and the advertisement DB 52 shown in FIG. 1. A CPU (Central Processing Unit) 101 of a computer device in each server or terminal executes various processes in accordance with a program stored in a ROM (Read Only Memory) 102 or a program loaded to a RAM (Random Access Memory) 103 from a storage unit 108. The RAM 103 also appropriately stores any data, etc. necessary for execution of the various processes by the CPU 101.

The CPU 101, the ROM 102, and the RAM 103 are connected to each other via a bus 104. An input/output interface 105 is also connected to the bus 104.

The following are connected to the input/output interface 105: an input unit 106 including a keyboard, a mouse, a touch panel, etc.; an output unit 107 including a display such as an LCD (Liquid Crystal Display), a CRT (Cathode Ray Tube), an organic EL (Electroluminescence) panel, etc. and a speaker, etc.; the storage unit 108 constituted by an HDD (Hard Disk Drive), a flash memory device, etc.; and a communication unit 109 that performs a communication process via the communication network 2 or performs inter-device communication.

A media drive 110 is also connected as necessary to the input/output interface 105, and a removable media 111 such as a magnetic disk, an optical disk, a magneto-optical disk, or a semiconductor memory, etc. is appropriately mounted thereto. Thereby, writing and reading of information to/from the removable media 111 is carried out.

In this computer device, uploading and downloading of data and programs are carried out by communication performed by the communication unit 109. Further, data and programs can be transferred via the removable media 111.

The CPU 101 performs processing operations based on various programs, and thereby information processing and communication to be explained below are executed in the content distribution device 1, the user terminals 3, the shop terminals 4, the user DB 50, the terminal DB 51, and the advertisement DB 52 respectively.

Each of the information processing devices that constitute the content distribution device 1, the user terminals 3, the shop terminals 4, the user DB 50, the terminal DB 51, and the advertisement DB 52 is not limited to being configured by the computer device shown in FIG. 3 alone, and may be configured by multiple computer devices in a system. The multiple computer devices may be systemized by a LAN or the like, or they may be disposed at a remote location in a state in which communication is enabled by a VPN (Virtual Private Network), etc. using the internet or the like.

3. DB

The various DBs managed by the content distribution device 1 will now be explained.

[3-1. User DB]

Information about users who receive an advertisement distribution service (i.e. users who receive advertisement information) provided by the content distribution device 1 is stored in the user DB 50. For example, personal information such as a login password, name, age, gender, address, e-mail address, income, hobbies, etc. is associated with a single user ID (Identification) capable of specifying a single user and stored. Further, information such as a field in which the user is interested is also stored. This information is utilized when selecting an advertisement to be distributed.

[3-2. Terminal DB]

A terminal ID, a user ID, the communication capacity limit value, the determination target period length, and the start time are stored in the terminal DB 51 as information of the user terminal 3 which is used by a user. Further, information such as the intermediate determination period length, the remaining communication amount (including the predicted remaining communication amount), the average used communication amount, the threshold value, and the distribution control state may also be stored therein.

In the following, a concrete example will be explained referring to FIG. 4.

The terminal DB 51 stores various information associated with a single terminal ID indicated as "D_00001". As the various information, "U_32819" is stored as the user ID of the user using the terminal, "3 Gbytes" is stored as the communication capacity limit value, "one month" is stored as the determination target period length, "10 days" is stored as the intermediate determination period length, "12:00 AM on the first day of each month" is stored as the start time, "1.2 Gbytes" is stored as the remaining communication amount, "80 Mbytes/day" is stored as the average used communication amount, "200 Mbytes" is stored as the threshold value, and "normal state" is stored as the distribution control state.

The information indicated as terminal ID="D_00001" is information that is used when determining the distribution control state on the basis of the information of the remaining communication amount and the threshold value (this will be explained in detail below).

Further, the information associated with the terminal ID indicated as "D_00002" does not include information of the threshold value. The information for "D_00002" is information that is used when determining the distribution control state from the remaining communication amount and the remaining time without using a threshold value of a fixed value in order to determine the distribution control state of the user terminal.

Further, the information associated with the terminal ID indicated as "D_00003" does not include any information other than the user ID. This indicates a state in which the various information of the terminal indicated as terminal ID="D_00003" has not yet been estimated. In other words, the various information will be stored upon performing various estimation processes.

As the start time, the next start time may be stored instead of the information "12:00 AM on the first day of each month". In other words, the information "12:00 AM on October 1st" is stored during September, and when it becomes October 1st, then the information "12:00 AM on November 1st" is stored.

Further, as the start time, a period having a certain range such as "the first to fifth days of each month" may be stored. In other words, until the start time is established, a state in which "it is estimated that the time will be reset at some time during the first to fifth days of each month", etc. is possible, and thus such a state may be stored.

Further, with regard to the communication capacity limit value as well, a state in which "it is estimated that the communication capacity limit value is between 1 Gbyte and 2 Gbytes", etc. is possible until the communication capacity limit value is established, and thus the communication capacity limit value may be stored having such a width. Similarly, the determination target period length may also be stored having such a width.

The communication capacity limit value is estimated in the case that it has been determined that the communication speed has changed from high speed to low speed. For example, in the case that the communication speed was high speed when the accumulated communication amount was 1 Gbyte whereas the communication speed became low speed when the accumulated communication amount reached 2 Gbytes, it is estimated that the communication capacity limit value is between 1 Gbyte and 2 Gbytes.

The threshold value is a value provided for determining the state of the user terminal from the remaining communication amount, and the state is determined as a "limit-requiring state" when the remaining communication amount has dropped below the threshold value.

Instead of the various estimated information described above, the correct values may be set by the user.

[3-3. Advertisement DB]

Information of an advertisement for which distribution was requested by a distribution requester using the content distribution service of the content distribution device 1 is stored in the advertisement DB 52. For example, the advertisement DB 52 stores a distribution requester ID, an advertisement content (the text written as the advertisement, etc.), distribution target conditions (information defining to what kind of users the advertisement is to be distributed), the distribution number (information defining to how many users the advertisement is to be sent), the scheduled distribution date, and the like associated with an advertisement ID which can uniquely specify an advertisement.

Further, two advertisements generated for a single advertisement for which distribution was requested by a distribution requester may be stored. In the present embodiment, an example is used in which an advertisement having a large information amount and an advertisement having a small information amount are used as the two advertisements. Specifically, an advertisement with images (a first content) that includes all of the advertisement information (image data and character data) for which distribution was requested, and an advertisement without images (a second content) from which the image data has been eliminated (i.e. including only the character data) are stored. In this case, either the advertisement with images or the advertisement without images is selected in accordance with the circumstances of the user.

4. ADVERTISEMENT DISPLAY MODE

In the present embodiment, an example is given in which a user uses a portable terminal such as a mobile telephone as the user terminal 3. One example of the display mode of the advertisement is an embodiment in which an advertisement is displayed on the portable terminal using a lock release screen. A lock release screen is a screen that is displayed when the portable terminal is restored from a sleep mode (a state in which the display screen is OFF) to a normal mode, and is provided in order to prevent the portable terminal from being used by a person who has illegally obtained the portable terminal.

In the lock release screen, an input box for inputting a password or the like is displayed, and the portable terminal cannot be used unless the correct password that was set by the original user is input.

A concrete display mode will now be explained referring to FIG. 5.

It is assumed that a dedicated application for using the advertisement distribution service provided by the content distribution device 1 has been installed in the portable terminal serving as the user terminal 3.

Figure 5A:
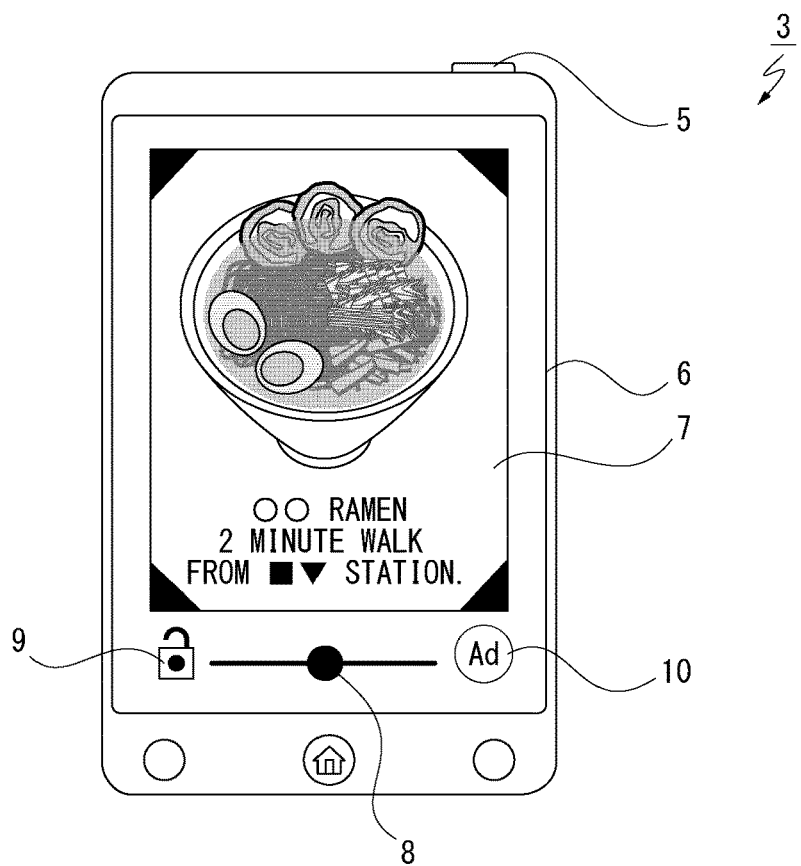
FIG. 5A-5B illustrates example of an advertisement display mode.

First, when the user presses a power button 5 of the portable terminal serving as the user terminal 3 in order to restore the portable terminal from the sleep mode, a startup selection screen is displayed on a display screen 6 of the user terminal 3 as shown in FIG. 5A. The startup selection screen is for prompting a user to select a startup method.

In the startup selection screen, an advertisement display region 7 is provided, and therebelow a pointer 8, a lock release icon 9, and an advertisement display icon 10 are displayed.

Figure 5B:
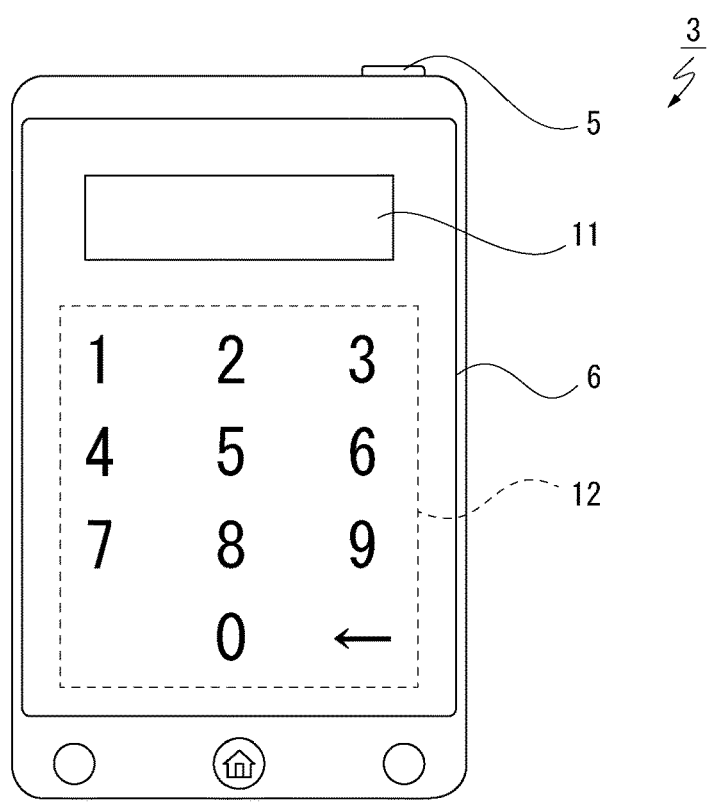

From the state shown in FIG. 5A, when the user performs an operation to move the pointer 8 to the right and overlay the pointer 8 on the advertisement display icon 10, a lock release screen as shown in FIG. 5B is displayed on the display screen 6.

In the lock release screen, an input box 11 for inputting a password and an option display box 12 in which the numbers 0 to 9 are displayed as options are displayed.

The user performs an operation to select the numbers displayed in the option display box 12, and thereby numbers are input into the input box 11.

When the correct password has been input, a detailed advertisement screen is displayed on the display screen 6 for viewing detailed information of the advertisement that was displayed on the startup selection screen.

Further, if the user performs on operation to move the pointer 8 to the left and overlay the pointer 8 on the lock release icon 9 in the startup selection screen of FIG. 5A, the lock release screen is displayed on the display screen 6, and then the normal screen of the portable terminal (i.e. a screen that is not the detailed advertisement screen) is displayed.

In other words, the user selects whether to view the detailed information of the advertisement by selecting whether to perform an operation to overlay the pointer 8 on the advertisement display icon 10 or to perform an operation to overlay the pointer 8 on the lock release icon 9.

In the following explanation, the operation for overlaying the pointer 8 on the lock release icon 9 will be referred to as an "advertisement non-viewing operation", and the operation for overlaying the pointer 8 on the advertisement display icon 10 will be referred to as an "advertisement viewing operation".

The user terminal 3 acquires, in advance via the network 2, simple advertisement information that is displayed on the startup selection screen shown in FIG. 5A (to be explained in detail below). The user terminal 3 acquires, via the communication network 2, detailed advertisement information that is displayed on the detailed advertisement screen each time it is necessary to display the detailed advertisement information. At this time, as the information to be displayed in the detailed advertisement screen, either the advertisement with images having a large information amount or the advertisement without images having a small information amount is displayed.

The process for selecting which advertisement to display is carried out as explained below in the following processes.

5. PROCESS OF USER TERMINAL

Figure 6:
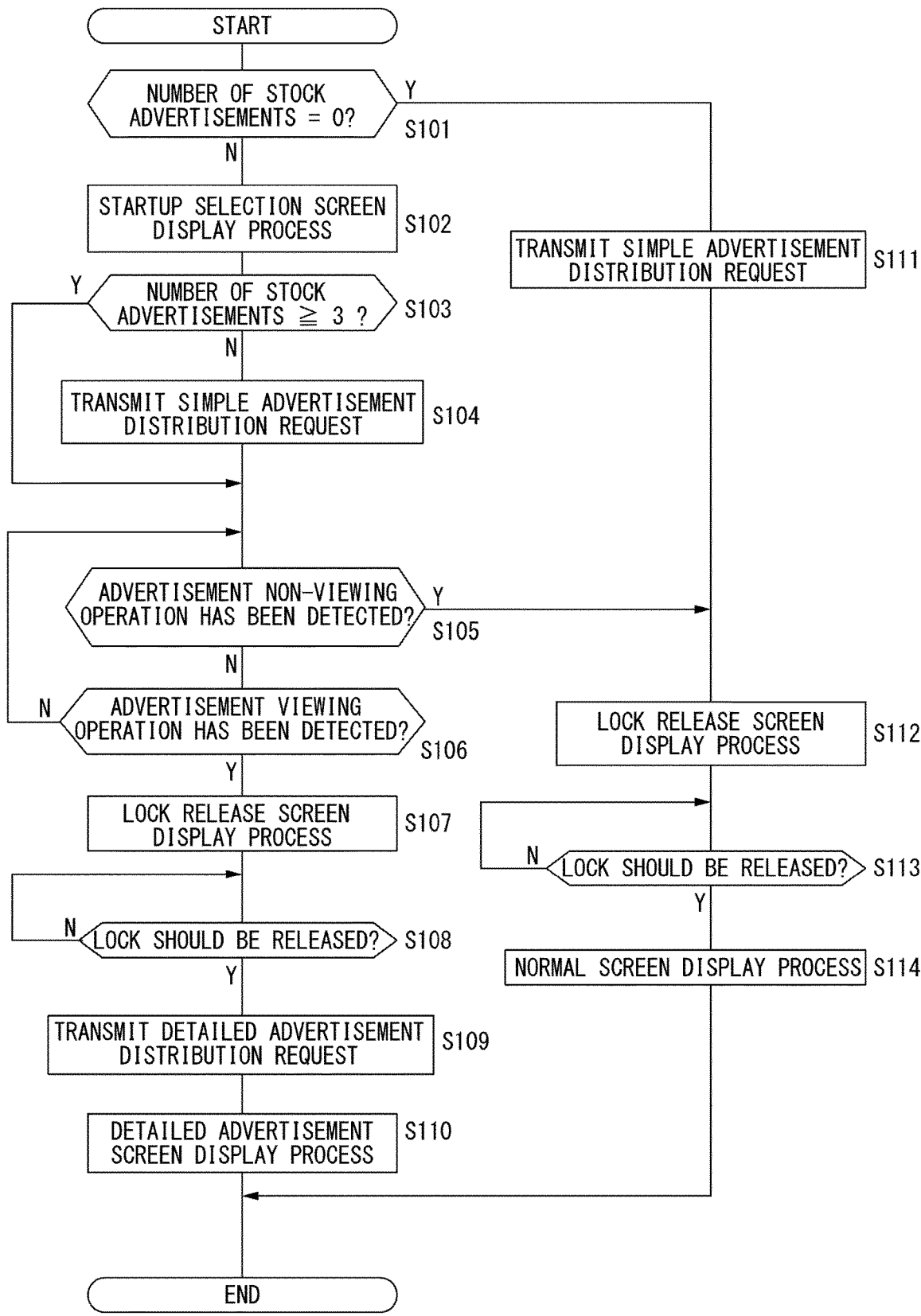
FIG. 6 is a flowchart of a process executed by a user terminal.

FIG. 6 shows an example of a series of processes executed by the user terminal 3 when the user has performed an operation to restore the portable terminal from the sleep mode to the normal mode on the user terminal 3 serving as the portable terminal in which the dedicated application has been installed.

When the above operation has been performed, the user terminal 3 performs, in step S101, a process for determining whether the number of stock advertisements is zero. The number of stock advertisements is the number of simple advertisement information units to be displayed on the startup selection screen (FIG. 5A). If the number of stock advertisements is zero, it is indicated that the user terminal 3 is not retaining any simple advertisement information units to be displayed on the startup selection screen.

If the number of stock advertisements is not zero, i.e. if simple advertisement information units are being retained, the user terminal 3 executes, in step S102, a startup selection screen display process. As a result of this process, the startup selection screen shown in FIG. 5A is displayed on the screen of the user terminal 3. If it is necessary to select the advertisement to be displayed on the startup selection screen, the user terminal 3 performs this selection process in advance.

Next, the user terminal 3 executes, in step S103, a process for determining whether the number of stock advertisements is 3 or more.

If the number of stock advertisements is less than 3, it is indicated that the simple advertisement information units to be stocked must be increased. The number 3 is merely one example.

If the number of stock advertisements is not 3 or more, the user terminal 3 performs, in step S104, a process for transmitting a simple advertisement distribution request. As a result of this process, a prescribed number of simple advertisement information units are transmitted to the user terminal 3 from the content distribution device 1 which has received the simple advertisement distribution request.

After it has been determined that the number of stock advertisements is 3 or more, or after the simple advertisement distribution request has been transmitted, the user terminal 3 executes, in step S105, a process for determining whether the advertisement non-viewing operation has been detected.

If the advertisement non-viewing operation has not been detected, the user terminal 3 executes, in step S106, a process for determining whether the advertisement viewing operation has been detected.

The processes of steps S105 and S106 are executed until either the advertisement non-viewing operation or the advertisement viewing operation is detected. Although not illustrated, when the user terminal 3 has transitioned again to the sleep mode without any operation being performed in a fixed time period, the series of processes shown in FIG. 6 terminates.

The following will explain the case in which the advertisement viewing operation is detected in step S106, i.e. the case in which the user, upon viewing the simple advertisement information displayed on the startup selection screen shown in FIG. 5A, decided that he/she wants to view more detailed information of the advertisement, and thus performed the above-described advertisement viewing operation.

In this case, the user terminal 3 executes, in step S107, a process for displaying the lock release screen. As a result of this process, the lock release screen shown in FIG. 5B is displayed on the screen of the user terminal 3.

Next, the user terminal 3 executes, in step S108, a process for determining whether the lock should be released. If the user inputs the correct password, it is determined that the lock should be released.

If it has been determined that the lock should be released, the user terminal 3 executes, in step S109, a process for transmitting a detailed advertisement distribution request. As a result of this process, information of the advertisement with images or the advertisement without images serving as the detailed advertisement information is transmitted to the user terminal 3 from the content distribution device 1 which has received the detailed advertisement distribution request.

Next, the user terminal 3 executes, in step S110, a process for displaying the detailed advertisement screen. As a result of this process, the user can view the detailed advertisement information.

Next, the case in which it is determined in the process of step S101 that the number of stock advertisements is zero shall be explained. In this case, the user terminal 3 is not retaining any simple advertisement information units to be displayed on the startup selection screen. Thus, the user terminal 3 performs, in step S111, a process for transmitting the simple advertisement distribution request to the content distribution device 1. This process is identical to the process of step S104.

Next, the user terminal 3 executes, in subsequent step S112, the lock release screen display process, and then executes, in step S113, a process for determining whether the lock should be released. The processes of steps S112 and S113 are identical to the processes of steps S107 and S108.

Next, the user terminal 3 executes a normal screen display process in step S114.

In the case in which the advertisement non-viewing operation is detected in step S105, i.e. the case in which the user, upon viewing the simple advertisement information displayed on the startup selection screen shown in FIG. 5A, was not interested in detailed information of the advertisement, the user terminal 3 executes the processes of steps S112 to S114.

If the detailed advertisement information is presented, the user terminal 3 destroys the simple advertisement information based on the detailed advertisement information. At this time, the number of stock advertisements is decreased by one. Further, even if the detailed advertisement information is not presented, the number of stock advertisements may be decreased by one if the simple advertisement information is presented, because it can be determined that the advertisement value is low since the user was not interested in the advertisement.

6. PROCESS OF CONTENT DISTRIBUTION DEVICE

The flow of processes executed by the content distribution device 1 will now be explained referring to FIGS. 7 to 14.
[6-1. First Example of Detailed Advertisement Distribution Process]

Figure 7:
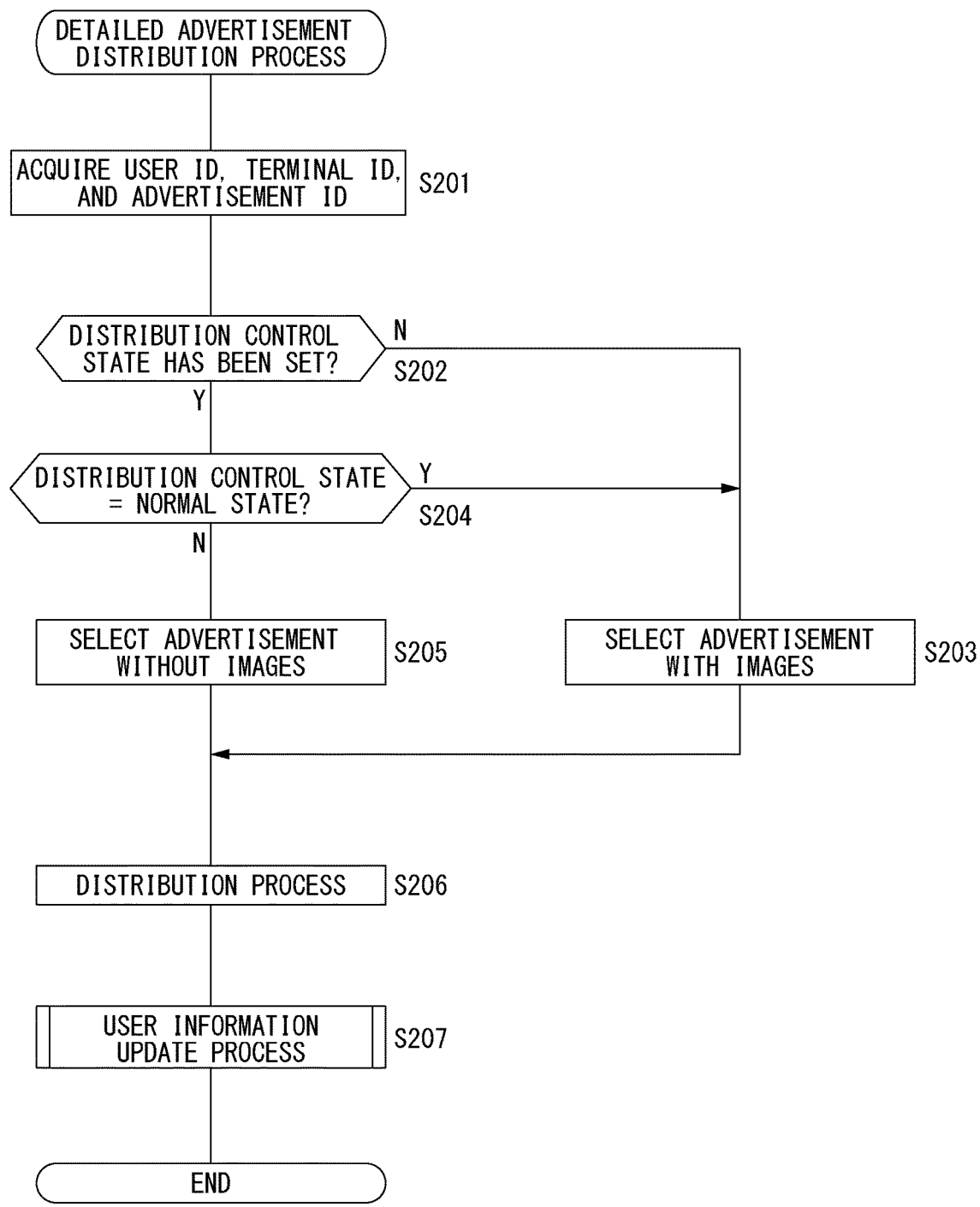
FIG. 7 is a flowchart of a first example of a detailed advertisement distribution process.

FIG. 7 illustrates a first example of a detailed advertisement distribution process executed by the content distribution device 1 upon receiving the detailed advertisement distribution request.

Upon receiving the detailed advertisement distribution request, the content distribution device 1 acquires, from the user terminal 3, information which can specify the terminal ID such as a MAC (Media Access Control) address (the content distribution device 1 may also acquire the terminal ID itself), the communication capacity used thus far, and the advertisement ID.

If the start time and the determination target period length are known, the communication capacity used thus far is regarded as the accumulated communication amount from the start time that has most recently elapsed.

The communication capacity that is accumulated each time the user terminal 3 performs communication by the dedicated application installed in the user terminal 3 is calculated as the communication capacity used thus far, and this is notified to the content distribution device 1 during transmission of the detailed advertisement distribution request.

In the case that the accumulated communication amount of the user terminal 3 can be acquired, then the acquired accumulated communication amount is notified to the content distribution device 1 during transmission of the detailed advertisement distribution request.

The case that the accumulated communication amount of the user terminal 3 can be acquired includes not only a case in which this information can be acquired from the user terminal 3, but also cases such as that in which this information regarding the user terminal 3 can be acquired from a company by using an API (Application Programming Interface).

In the following explanations, the terminal to which the detailed advertisement is to be distributed shall be referred to simply as the "user terminal 3".

First, in the first example of the detailed advertisement distribution process, the content distribution device 1 acquires, in step S201, the user ID, the terminal ID, and the advertisement ID. The terminal ID is acquired from the terminal DB 51 using information received from the user terminal 3, or is acquired directly from the user terminal 3. The user ID is acquired from the terminal DB 51 on the basis of the terminal ID. The advertisement ID is acquired from the user terminal 3.

Next, the content distribution device 1 determines, in step S202, whether the distribution control state of the user terminal 3 has been set. As explained above, the distribution control state is information indicating a normal state in which an advertisement having a large information amount may be sent, or a limit-requiring state in which it is preferable to send an advertisement having a small information amount, and the distribution control state is appropriately set in the process of step S207 to be explained below.

In the case that it is determined in step S202 that the distribution control state has not been set, i.e. the case in which it has not been established whether the distribution control state is the normal state or the limit-requiring state, the content distribution device 1 executes, in step S203, a process for selecting the advertisement with images (i.e. the first content having a large information amount) as the detailed advertisement information associated with the advertisement ID which was acquired.

On the other hand, in the case that it is determined in step S202 that the distribution control state has been set, the content distribution device 1 executes, in step S204, a process for confirming which state has been set as the distribution control state in the user terminal 3.

If it is determined that the distribution control state of the user terminal 3 has been set to the normal state, the content distribution device 1 executes the process of step S203 described above, and selects the advertisement with images.

If it is determined that the distribution control state of the user terminal 3 has been set to the limit-requiring state, the content distribution device 1 executes, in step S205, a process for selecting the advertisement without images (i.e. the second content having a small information amount) as the detailed advertisement information associated with the advertisement ID which was acquired.

Next, the content distribution device 1 performs, in step S206, a distribution process for distributing the selected detailed advertisement information to the user terminal 3. As a result of this process, the detailed advertisement information is presented on the screen of the user terminal 3.

Next, the content distribution device 1 executes, in step S207, a user information update process for updating the user information using various information which can be acquired during the distribution process of step S206 described above. Herein, the user information to be updated includes the communication capacity limit value, the determination target period length, the start time, and the distribution control state, etc.

Several examples of the user information update process will be explained below.
[6-2. Second Example of Detailed Advertisement Distribution Process]

Figure 8:
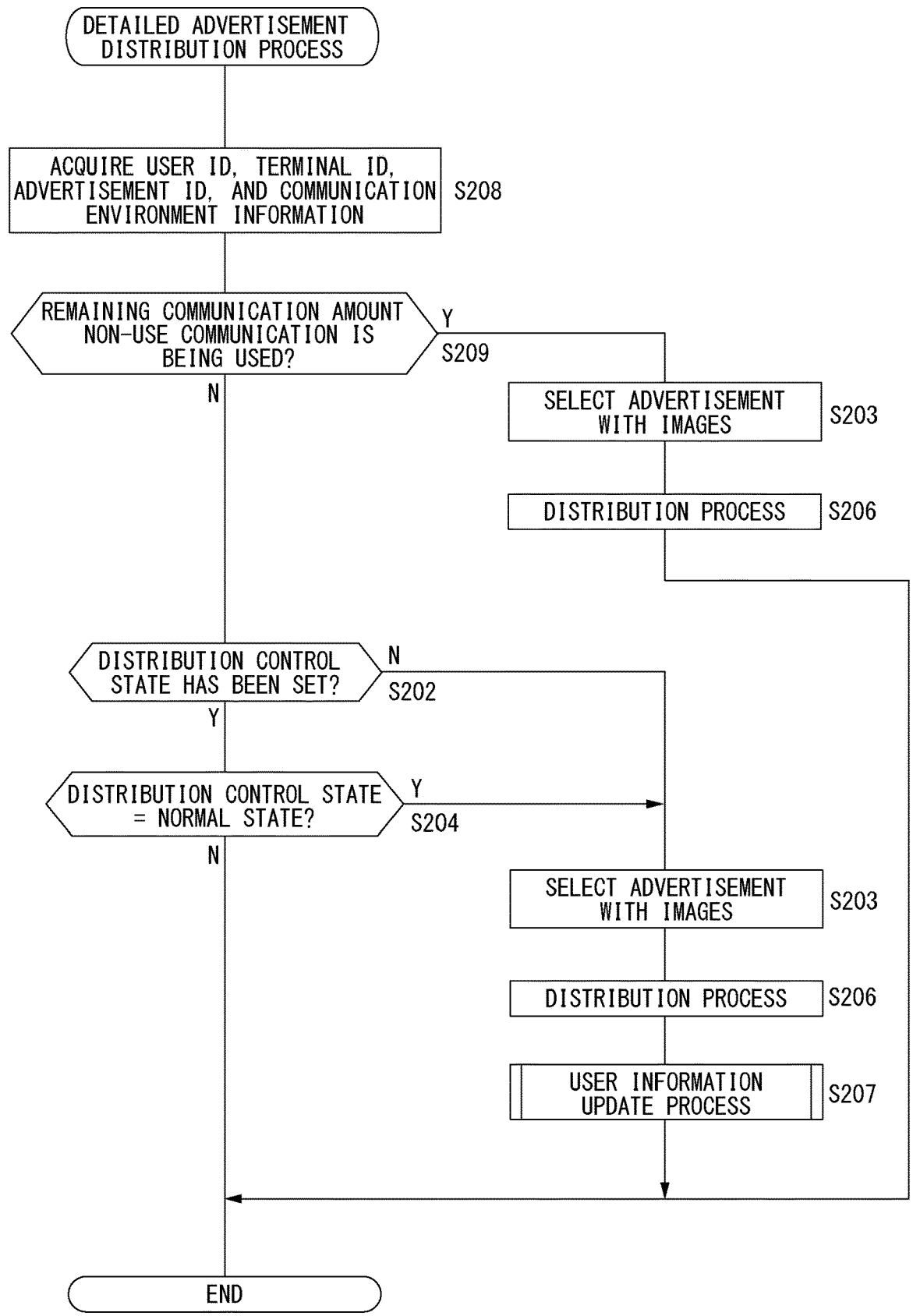
FIG. 8 is a flowchart of a second example of the detailed advertisement distribution process.

FIG. 8 illustrates a second example of the detailed advertisement distribution process executed by the content distribution device 1 upon receiving the detailed advertisement distribution request.

In the second example of the detailed advertisement distribution process, upon receiving the detailed advertisement distribution request, the content distribution device 1 acquires from the user terminal 3 information of a communication environment being used by the user terminal 3 in addition to the various information explained above in the first example.

The information of the communication environment is information that indicates, for example, a state in which network communication utilizing the communication plan contracted by the user is being used, or a state in which some other network communication is being used (such as network communication utilizing a WiFi (registered trademark) wireless environment which can be used for free in a public place). In the following explanations, communication which is carried out without consuming the remaining communication amount of the communication plan set by the company will be referred to as "remaining communication amount non-use communication".

In the second example of the detailed advertisement distribution process, the processes among those executed by the content distribution device 1 which are the same as those of the first example of the detailed advertisement distribution process will be assigned the same reference sign, and explanations thereof will be appropriately omitted/simplified.

As shown in FIG. 8, the content distribution device 1 first executes, in step S208, a process for acquiring various information from the user terminal 3. This various information includes communication environment information in addition to the user ID, the terminal ID, and the advertisement ID explained above in the first example of the detailed advertisement distribution process.

Next, the content distribution device 1 determines, in step S209, whether remaining communication amount non-use communication is being used. This determination is made on the basis of the communication environment information acquired from the user terminal 3. This determination can be made, for example, on the basis of whether a WiFi wireless environment is being used. For example, if it is indicated by the communication environment information acquired from the user terminal 3 that the user terminal 3 is in a state of using a WiFi wireless environment, the content distribution device 1 determines that the user terminal 3 is using remaining communication amount non-use communication. If it is indicated that the user terminal 3 is in a state of using network communication utilizing the communication plan contracted by the user, the content distribution device 1 determines that the user terminal 3 is not using remaining communication amount non-use communication.

In the case that it is determined that the user terminal 3 is using remaining communication amount non-use communication, i.e. the case in which it is not necessary to consider the size of the information amount of the information to be transmitted to the user, the content distribution device 1 executes the processes of steps S203 and S206. These processes are identical to the processes of the first example of the detailed advertisement distribution process.

On the other hand, in the case that it is determined that the user terminal 3 is not using remaining communication amount non-use communication, i.e. the case in which the communication speed of the user terminal 3 may decrease depending on the information amount to be transmitted to the user, the content distribution device 1 executes, in step S202, the process for determining whether the distribution control state has been set. If the distribution control state has not been set, the content distribution device 1 executes the processes of steps S203, S206, and S207.

If it is determined that the distribution control state has been set, the content distribution device 1 executes, in step S204, the process for determining whether the distribution control state is the normal state.

If the distribution control state is the normal state, the content distribution device 1 executes the processes of S203, S206, and S207.

If the distribution control state is the limit-requiring state, the content distribution device 1 terminates the series of processes of FIG. 8 without selecting an advertisement. In other words, the series of processes is terminated without the detailed advertisement information being transmitted to the user terminal 3.

If the distribution control state is the limit-requiring state, the content distribution device 1 may distribute the advertisement without images as in the detailed advertisement distribution process shown in FIG. 7.

[6-3. First Example of User Information Update Process]

A first example of the user information update process shown in step S207 of FIGS. 7 and 8 will now be explained referring to FIG. 9.

The user information update process is executed for calculating, as estimated values, the communication capacity limit value, the determination target period length, the start time, and the accumulated communication amount of the user terminal 3 in the case that these various values cannot be accurately acquired. In other words, the user information update process does not need to be carried out in the case that all of these numerical values are accurately stored/managed in the user terminal 3 and can be notified to the content distribution device 1 for each detailed advertisement distribution request.

In the following explanation, the date/time at which the previous user information update process was executed will be referred to as the previous date/time, and the date/time at which the current user information update process was executed will be referred to as the current date/time.

In the user information update process, the content distribution device 1 first executes, in step S301, a process for acquiring the distribution time and the information amount. Prior to the user information update process, a process for distributing the detailed advertisement information to the user terminal 3 has been carried out in step S206 of FIGS. 7 and 8. In step S301, the information amount of the detailed advertisement information that was sent during the above distribution process and the distribution time which serves as information of the time required for the distribution are acquired.

Next, the content distribution device 1 executes, in step S302, a process for calculating the communication speed from the acquired distribution time and information amount. Hereinafter, the calculated communication speed will be referred to as the "current communication speed".

Next, the content distribution device 1 determines, in step S303, whether various estimated information (information estimating the communication capacity limit value, the determination target period length, the start time, etc.) has already been calculated from the past history. Herein, "already been calculated" indicates a case in which the various estimated information has been calculated as single values without having any width. For example, it is determined that the estimated information of the start time has "already been calculated" if it has been specified, as in "12:00 AM on the 10th day of each month" or the like, and it is determined that the estimated information of the start time has "not already been calculated" if it has not been sufficiently specified, as in "between the 10th and 12th day of each month" or the like.

In the case that the estimated information has already been calculated, the content distribution device 1 further determines, in step S304, whether a contradiction exists between the various estimated information and the communication speed in the current distribution process.

If no contradiction exists, i.e. if the various estimated information has already been calculated and the communication speed during the current detailed advertisement distribution was an appropriate communication speed based on the various estimated information, the content distribution device 1 executes, in step S305, a process for calculating the remaining communication amount.

For example, if it is notified from the user terminal 3 that the accumulated communication amount for the current month is "3 Gbytes" in a state in which the communication capacity limit value is "5 Gbytes", the determination target period length is "one month", and the start time is "12:00 AM on the first day of each month", the remaining communication amount is calculated as "2 Gbytes". The remaining communication amount is stored in the terminal DB 51.

Next, the content distribution device 1 executes a state determination process in step S306. In this process, the state is determined to be the "limit-requiring state" if the remaining communication amount has dropped below the prescribed threshold value, and the state is determined to be the "normal state" if the remaining communication amount has not dropped below the prescribed threshold value. The threshold value is stored in the terminal DB 51.

Figure 9:
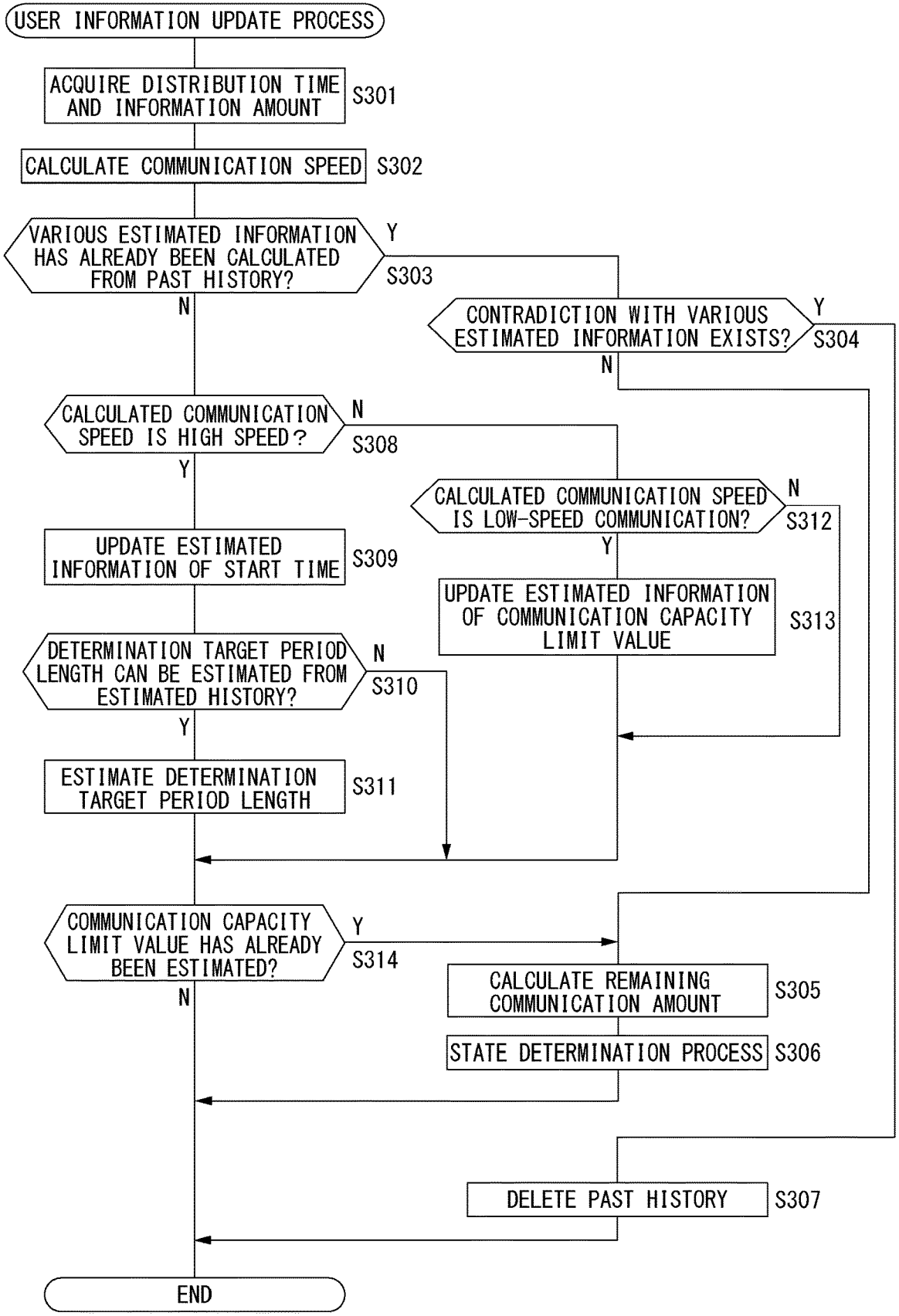
FIG. 9 is a flowchart of a first example of a user information update process.

In FIG. 9, the user information update process is terminated upon performing the process of step S306. However, the average used communication amount, etc. may be calculated and then the information of the terminal DB 51 may be updated.

On the other hand, if there is a contradiction between the various estimated information and the current communication speed in step S304, i.e. if the various estimated information has already been calculated but the current communication speed contradicts the various estimated information, it is understood that there is a high possibility that the communication plan being used by the user has changed. Thus, the content distribution device 1 performs, in step S307, a process for deleting the past history, and the series of processes of FIG. 9 terminates.

The above-mentioned contradiction refers to a case in which, for example, the current communication speed was high speed even though the previous communication speed was low speed and the start time does not fall between the previous date/time and the current date/time (i.e. it is presumed that the start time has not been reset).

In order to avoid accidental deletion of the history, a delay may be placed on the history deletion. In other words, in the case that the number of times in which it has been determined that a contradiction exists in the process of step S304 has exceeded a prescribed number of times (for example, three times, etc.), it may be determined that the communication plan has been changed and then the history may be deleted. The history is information for calculating the various estimated information, and it is necessary to accumulate a new history when the communication plan has changed.

Next, a case in which it is determined in step S303 that the various estimated information has not already been calculated shall be explained.

In this case, the content distribution device 1 executes, in step S308, a process for determining whether the current communication speed is high speed from the history of the communication speed of the user terminal 3.

If it is determined that the current communication speed is high-speed communication, the content distribution device 1 executes, in step S309, a process for updating the estimated information of the start time that is stored in the terminal DB 51.

Herein, the estimated information of the start time that is updated shall be explained.

If the previous communication speed was low speed and the current communication speed was high speed, there is a high possibility that the user terminal 3 has entered a state in which high-speed communication can be used due to reaching the start time between the previous date/time and the current date/time, which resulted in a reset of the accumulated communication amount. If such a state is detected, the estimated information of the start time is updated. For example, in a state in which the start time is estimated to be some time "between the 10th day and the 15th day of each month", if the previous date/time (low-speed communication) is the "12th day" and the current date/time (high-speed communication) is the "15th day", then the estimated information is updated from "between the 10th day and the 15th day" to "between the 12th day and the 15th day". In other words, the accuracy of the estimated information increases.

Next, the content distribution device 1 determines, in step S310, whether the determination target period length can be estimated from an estimated history of the start time. Although not illustrated, the estimated history of the start time is, for example, stored in the terminal DB 51.

For example, in the case that the estimated history of the start time is "between July 10th and July 14th", "between August 8th and August 22nd", and "between September 9th and September 13th" and it is estimated from this information that the start time is some time "between the 10th day and the 13th day", "between the 10th day and the 13th day" of each month is included in the estimated dates/times of the start time and there are no estimated dates/times deviating from this period. Therefore, the determination target period length of the user terminal 3 is estimated to be "one month".

Further, if estimated dates/times such as "between July 18th and July 24th", "between August 19th to August 21st", and "between August 30th and September 4th" also exist in addition to "between July 10th and July 14th", "between August 8th and August 22nd", and "between September 9th and September 13th", even if "between the 10th day and the 13th day" of each month is included in the estimated dates/times of the start period, the determination target period length cannot be estimated to be "one month" from these periods. In this case, "between the 10th day and the 13th day", "between the 19th day and the 21st day", and "between the 30th day and the 4th day" of each month are candidates of the start time, and thus the determination target period length is estimated to be "10 days".

Moreover, if the estimated dates/times of the start time are overly dispersed, it is also conceivable that the accumulated communication amount is reset in one-day units. In this case, it is not necessary to estimate the date, and the time alone at which the accumulated communication amount is reset can be estimated.

If it is determined that the determination target period length can be estimated, the content distribution device 1 executes, in step S311, a process for estimating the estimated information of the determination target period length and updating the information stored in the terminal DB 51.

On the other hand, if it is determined in step S308 that the current communication speed is not high-speed communication, the content distribution device 1 executes, in step S312, a process for determining whether the current communication speed is low-speed communication.

If it is determined that the current communication speed is low-speed communication, the content distribution device 1 executes, in step S313, a process for updating the estimated information of the communication capacity limit value stored in the terminal DB 51.

The estimated information of the communication capacity limit value that is updated will now be explained.

In contrast to the example explained above, in the case that the previous communication speed was high speed and the current communication speed was low speed, it is estimated that the communication capacity limit value is between the previous accumulated communication amount and the current accumulated communication amount.

In the process for updating the estimated information of the communication capacity limit value, the estimated information is appropriately updated to information of increased accuracy as in the process for updating the estimated information of the start time explained above.

If it is determined in step S312 that the current communication speed is neither high speed nor low speed, the content distribution device 1 executes the process of step S314.

After it has been determined that the current communication speed is high speed or low speed and the processes related thereto have been executed (i.e. after the processes of steps S308 to S313 have been executed), the content distribution device 1 executes, in step S314, a process for determining whether the communication capacity limit value has already been estimated.

If the communication capacity limit value has already been estimated, the content distribution device 1 executes the processes of steps S305 and S306. In other words, the content distribution device 1 calculates the remaining communication amount and executes the state determination process.

At this time, if the estimation information of the communication capacity limit value has a width, the remaining communication amount may be calculated as an estimated value in which the remaining communication amount is imparted with a width, and then the terminal DB 51 may be updated.

After the process of step S314 has been executed, the content distribution device 1 terminates the series of processes shown in FIG. 9.

When determining whether the communication speed is high speed or low speed, it is preferable to make this determination upon referring to the various communication plans provided by the various communication companies at that time. In other words, since communication speeds tend to become slower over time, making determinations regarding high speed/low speed on the basis of the same value forever should be avoided, and the value used for the determination should be updated.

[6-4. Second Example of User Information Update Process]

A second example of the user information update process shown in step S207 of FIGS. 7 and 8 will now be explained referring to FIG. 10.

In the second example of the user information update process, the processes to be executed which are the same as those of the first example of the user information update process will be assigned the same reference sign, and explanations thereof will be appropriately omitted/simplified.

In the second example of the user information update process, a predicted remaining communication amount (remaining communication amount that is predicted when the start time has come) is calculated instead of the remaining communication amount (remaining amount of the communication capacity at the time the current user information update process is carried out).

Further, unlike the first example, the distribution control state of the user terminal 3 is determined without using a threshold value.

First, the processes in steps S301 and S302 for acquiring the distribution time and the information amount and calculating the current communication speed therefrom are the same as those of the first example.

Next, if it is determined in step S303 that the various estimated information has already been calculated, the content distribution device determines, in step S304, whether there exists a contradiction between the various estimated information and the current communication speed. If a contradiction exists, the content distribution device 1 deletes the past history similar to the first example, and terminates the series of processes of FIG. 10.

On the other hand, if it is determined that there is no contradiction, the content distribution device 1 executes the process of S315 to calculate the remaining time (the time remaining until the start time).

Next, the content distribution device 1 executes, in step S316, a process for calculating the average used communication amount and updating the information in the terminal DB 51.

Next, the content distribution device 1 executes, in step S317, a process for calculating the predicted remaining communication amount and updating the information in the terminal DB 51. For example, if the communication capacity limit value is "3 Gbytes", the accumulated communication amount is "2 Gbytes", the remaining time is "10 days", and the average used communication amount is "0.8 Gbytes/day", then the predicted remaining communication amount is "0.2 Gbytes".

The content distribution device 1 then executes a state determination process in step S318. In this process, for example, if the predicted remaining communication amount is a negative value or is equal to or less than a prescribed value, the distribution control state of the user terminal 3 is determined to be the "limit-requiring state". Upon executing this process, the content distribution device 1 terminates the series of processes shown in FIG. 10.

On the other hand, if it is determined in step S303 that the various estimated information has not already been calculated, the content distribution device 1 executes the processes of steps S308 to S313 similar to the first example, and then executes, in step S319, a process for determining whether the predicted remaining communication amount can be calculated.

Figure 10:
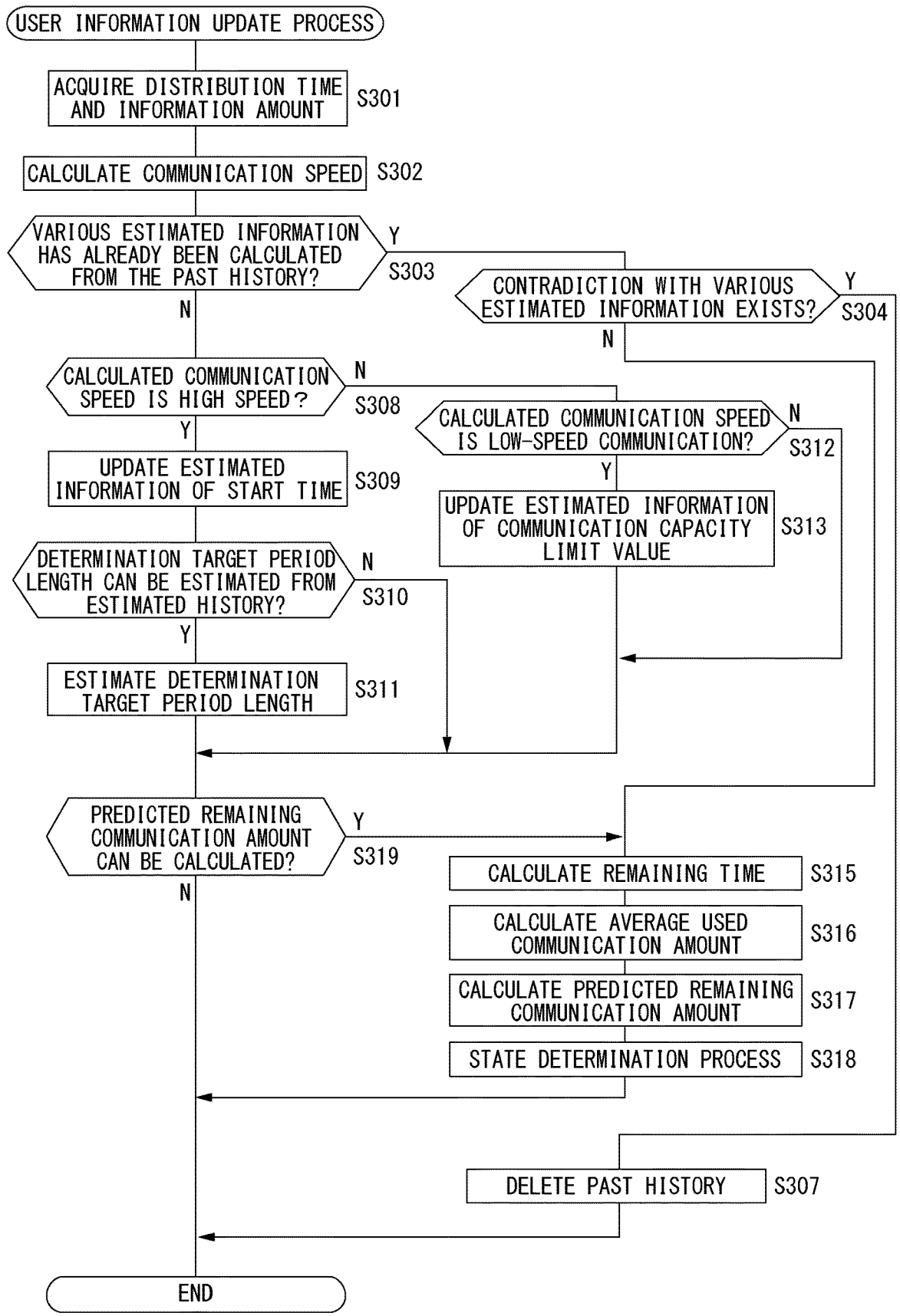
FIG. 10 is a flowchart of a second example of the user information update process.

If the predicted remaining communication amount cannot be calculated, i.e. if the various estimated values, etc. which are used for the above-described calculation have not been calculated, then the content distribution device 1 terminates the series of processes shown in FIG. 10.

On the other hand, if the predicted remaining communication amount can be calculated, the content distribution device 1 executes the processes of steps S315 to S318 to calculate the predicted remaining communication amount and update the various information stored in the terminal DB 51.

[6-5. Communication Plan Information Acquisition Process]

An example of a screen displayed on the user terminal 3 when a communication plan information acquisition process has been executed will now be explained referring to FIG. 11.

The communication plan information acquisition process is a process for acquiring highly reliable information via the user terminal 3, and for example, the user is made to input various information in this process. In other words, this process is executed so that some of the various estimated information described above does not have to be estimated.

The information to be acquired includes, for example, the communication capacity limit value, the determination target period length, the start time, and the like.

The timing at which the content distribution device 1 executes the communication plan information acquisition process is, for example, the timing at which the dedicated application for using the advertisement distribution service is installed in the user terminal 3.

Figure 11:
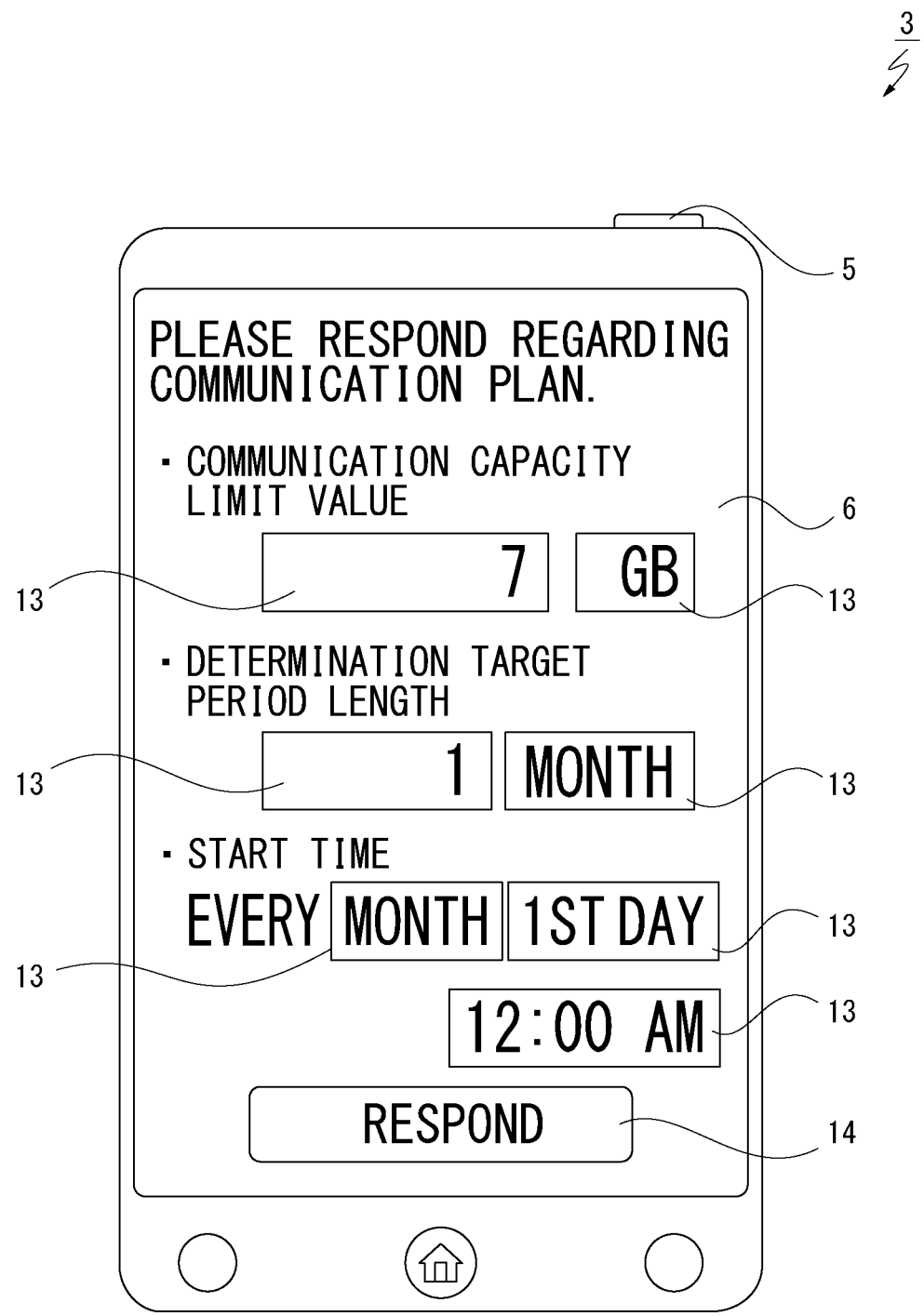
FIG. 11 illustrates an example of a communication plan information input screen.

When this process is executed, a communication plan information input screen as shown in FIG. 11 is displayed on the display screen 6 of the user terminal 3.

In the communication plan information input screen, a "respond" button 14 is disposed for transmitting to the content distribution device 1 the information input into input boxes 13, 13, 13, . . . , which are for inputting information regarding the communication plan.

Specifically, input boxes 13, 13 are provided for inputting a numerical value and a unit of the communication capacity limit value so as to input information regarding the communication capacity limit value.

Input boxes 13, 13 are provided for inputting a numerical value and a unit of the determination target period length so as to input information regarding the determination target period length.

Input boxes 13, 13, . . . are provided for inputting information such as "month", "week", "day", "1st day", "Monday", "12:00", etc. so as to input information regarding the start time.

When the "respond" button 14 is pressed, a process for transmitting to the content distribution device 1 the information input into the input boxes 13 is executed in the user terminal 3.

[6-6. Content Selection Process]

In the above-described examples, a case is explained where the first content (advertisement with images) and the second content (advertisement without images) are stored in the advertisement DB 52 for every advertisement. In the following, an example will be explained in which advertisements having only the first content, advertisements having only the second content, and advertisements provided with both the first content and the second content are mixed and stored in the advertisement DB 52.

Figure 12:
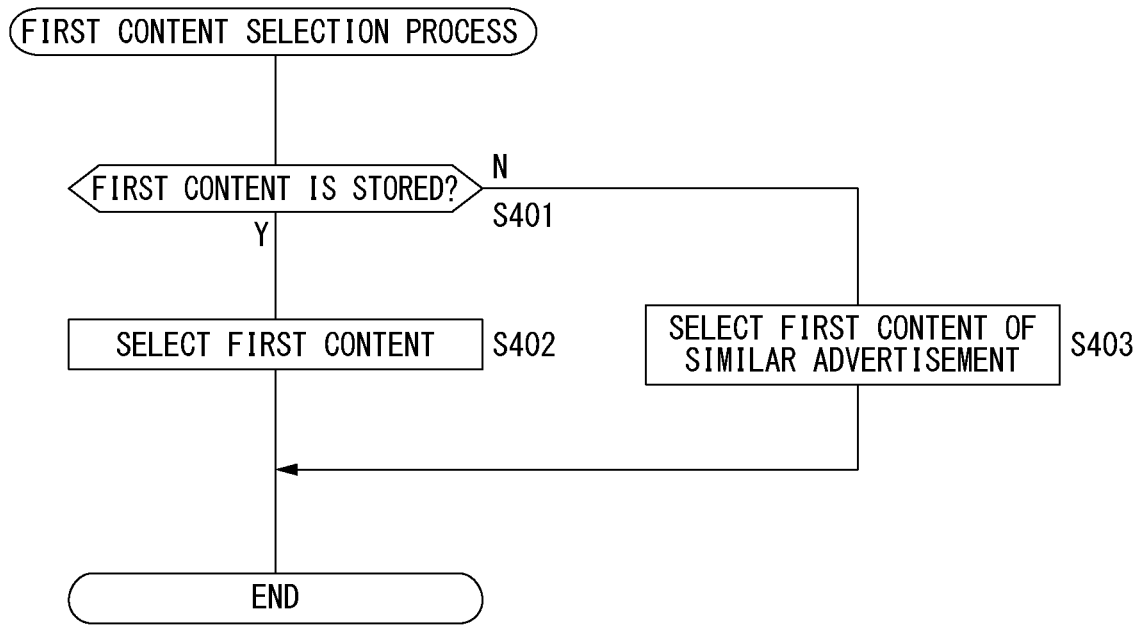
FIG. 12 is a flowchart of a first content selection process.

Therein, FIG. 12 illustrates an example of a first content selection process to be executed instead of the process for selecting the advertisement with images (step S203 in FIG. 7, and step S203 in FIG. 8).

The content distribution device 1 determines, in step S401, whether the first content is stored in the advertisement DB 52 as a detailed advertisement of the simple advertisement that is displayed on the startup selection screen of the user terminal 3.

If the first content is stored, the content distribution device 1 selects, in step S402, the detailed advertisement information serving as the first content.

On the other hand, if the first content is not stored in the advertisement DB 52, the content distribution device 1 selects, in step S403, a similar advertisement from the detailed advertisements serving as the first content that are stored in the advertisement DB 52.

Similar advertisements are, for example, advertisements of matching advertisement genres (such as the gourmet genre and the fashion genre).

Figure 13:
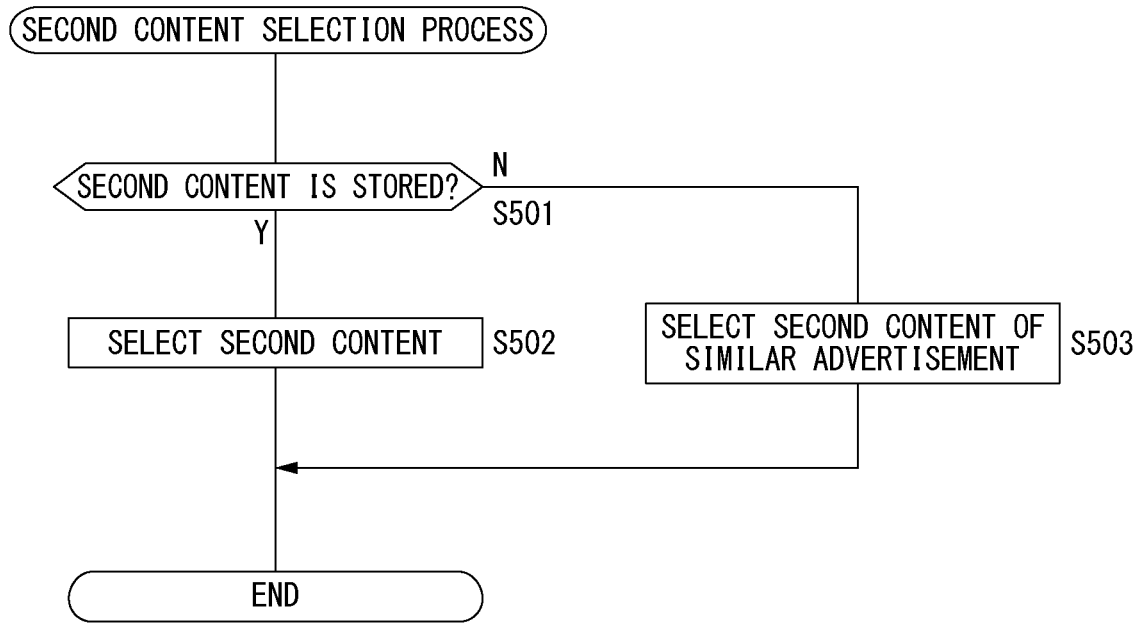
FIG. 13 is a flowchart of a second content selection process.

FIG. 13 illustrates an example of a second content selection process to be executed instead of the process for selecting the advertisement without images (step S205 in FIG. 7).

The content distribution device 1 determines, in step S501, whether the second content is stored in the advertisement DB 52 as a detailed advertisement of the simple advertisement that is displayed on the startup selection screen of the user terminal 3.

If the second content is stored, the content distribution device 1 selects, in step S502, the detailed advertisement information serving as the second content.

On the other hand, if the second content is not stored in the advertisement DB 52, the content distribution device 1 selects, in step S503, a similar advertisement from the detailed advertisements serving as the second content that are stored in the advertisement DB 52.

[6-7. Intermediate State Determination Process]

An example in which the distribution control state of the user terminal 3 is determined on the basis of the advertisement distribution request from the user terminal 3 was explained above. However, in the following, an example of an intermediate state determination process for determining the distribution control state of the user terminal 3 when an intermediate determination period has elapsed shall be explained.

Figure 14:
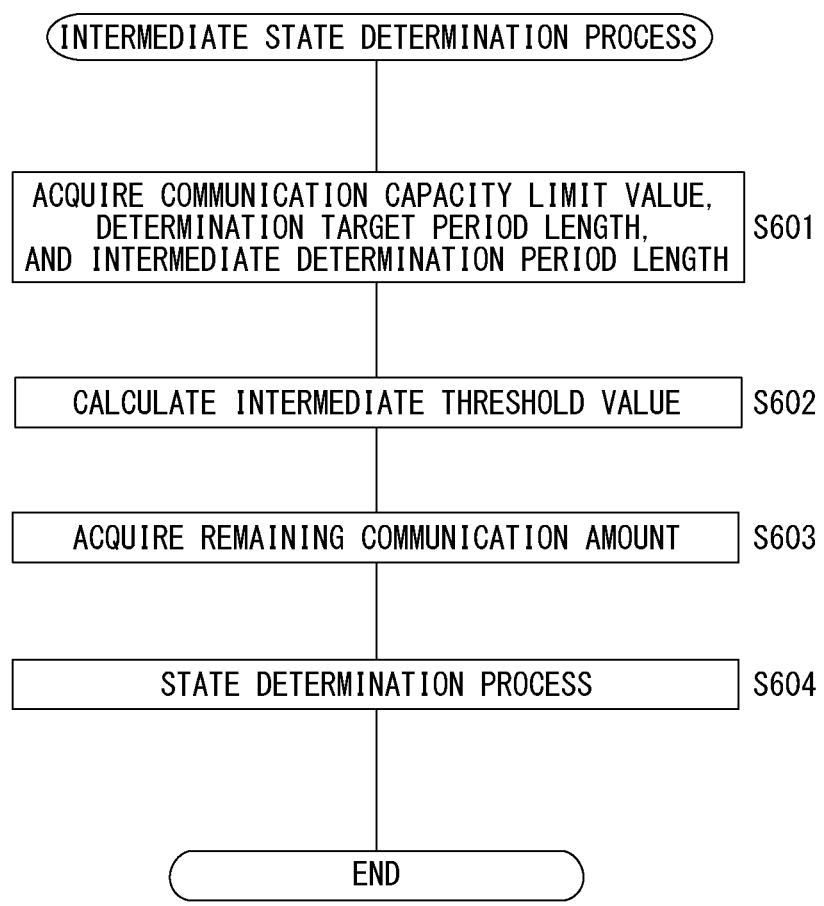
FIG. 14 is a flowchart of an intermediate state determination process.

FIG. 14 illustrates an example of the intermediate state determination process.

The process shown in FIG. 14 is executed on a user terminal 3 in which an intermediate determination period has elapsed.

First, the content distribution device 1 executes, in step S601, a process for acquiring from the terminal DB 51 various information of the communication capacity limit value, the determination target period length, and the intermediate determination period length regarding the user terminal 3 on which the process is to be executed.

Next, the content distribution device 1 executes, in step S602, a process for calculating the intermediate threshold value. For example, if the communication capacity limit value is "6 Gbytes", the determination target period length is "30 days", and the intermediate determination period length is "20"days, then the intermediate threshold value is calculated to be "2 Gbytes".

This calculation method will now be explained in detail below.

A value ("4 Gbytes") obtained by multiplying the ratio of the intermediate determination period length to the determination target period length by the communication capacity limit value is the communication capacity that is expected to have been consumed at the time the intermediate determination period has elapsed. In other words, "2 Gbytes" is the approximate value of the remaining communication amount at the time the intermediate determination period has elapsed. Thus, "2 Gbytes" is the intermediate threshold value.

The intermediate threshold value may be calculated by multiplying a fixed value (such as 1.2, etc.) by the value found above. Specifically, a value such as "2.4 Gbytes", obtained by multiplying "1.2" by "2 Gbytes", may be set as the intermediate threshold value. By determining the distribution control state at the time the intermediate determination period has elapsed using a value obtained by multiplying by a fixed value of "1" or more as the intermediate threshold value, advertisement distribution in which the communication capacity limit value is not easily reached can be realized.

Next, the content distribution device 1 executes, in step S603, a process for acquiring the remaining communication amount. As a result of this process, the remaining communication amount at the time the intermediate determination period has elapsed is acquired.

The content distribution device 1 then performs the state determination process in step S604. Therein, the distribution control state of the user terminal 3 at the time the intermediate determination period has elapsed is determined.

7. ALTERNATIVE EMBODIMENTS

In the above-described examples of the state determination process, it was determined whether the distribution control state is the normal state or the limit-requiring state. However, the determination may be made among three or more distribution control states.

For example, in addition to the "normal state" in which it is not necessary to limit the distribution of content and the "limit-requiring state" in which it is necessary to limit the distribution of content, a "distribution prohibited state" in which it is necessary to prohibit the distribution of content or the like may also be provided.

In this case, it is necessary to provide each distribution control state with the threshold values for the above-described determinations (the threshold value for determining the distribution control state from the remaining communication amount, the threshold value for determining the distribution control state from the predicted remaining communication amount, etc.).

Further, an example was explained above in which two types of information, i.e. the advertisement with images and the advertisement without images, are stored in the advertisement DB 52. However, only information of the first content in which the advertisement content and images forma set may be stored as one unit of advertisement information. Therein, in the case that the second content is selected, information resulting from removing the image information from the advertisement information of the first content may be transmitted to the user terminal 3.

Therein, one unit of information is stored as the advertisement information for each advertisement, and thus the management is simpler.

The timing at which the user terminal 3 performs the simple advertisement distribution request process for acquiring the simple advertisement information does not have to be the timing shown in FIG. 6, and the simple advertisement distribution request process may be executed in a state in which the user is not using the user terminal 3, or in other words a state in which the user terminal 3 has transitioned into the sleep mode.

Specifically, in steps S104 and S111 in FIG. 6, a process may be carried out for setting a flag (turning ON a flag) indicating that the simple advertisement distribution request is to be performed later, and then when the user terminal 3 is in the sleep mode, this flag may be determined and the simple advertisement distribution request may be carried out. Further, at this time, the simple advertisement distribution request may be performed only in an environment in which remaining communication amount non-use communication can be utilized.

Due to this configuration, the simple advertisement can be distributed without making the user feel any inconvenience and without oppressing the communication capacity limit value of the user.

In the examples explained above, the communication capacity limit value, the determination target period length, and the start time were set as one set constituting the communication plan to be used by the user terminal 3. However, two or more such sets may be set.

Specifically, for example, "7 Gbytes" may be provided as the communication capacity limit value for "1 month", and "300 Mbytes" may be further provided as the communication capacity limit value for "1 day".

In such a case, multiple records are stored in the terminal DB 51 for each user terminal 3, i.e. multiple records possessing the same terminal ID are stored. In each state determination process (processes in step S306 in FIG. 9 and step S318 in FIG. 10), the state is determined on the basis of the multiple records. In other words, when there is excess communication remaining with respect to all the limits, the state is determined to be the "normal state", and when there is no excess communication remaining with respect to at least one of the limits, the state is determined to be the "limit-requiring state".

8. CONCLUSION

The information processing device described in the above embodiments and alternative embodiments, etc. includes: the communication capacity limit management unit 1a that manages the communication capacity limit value of the user terminal 3 to which a content (advertisement) is to be distributed, and the determination target period which is a period during which a used communication capacity (accumulated communication capacity) is determined; the remaining communication amount calculation unit 1b that calculates, on the basis of the communication capacity limit value, a remaining communication amount in the determination target period; the content selection unit 1c that selects a content to be distributed according to the remaining communication amount; and the content distribution unit 1d that distributes the selected content to the user terminal 3.

Due to the above configuration, a distribution content is selected and transmitted according to the remaining communication amount for each user terminal 3.

Therefore, content distribution in which the remaining communication amount is consumed and the communication capacity limit value is reached can be avoided.

Further, the resources of the user terminal 3 can be effectively utilized by presenting valuable information (advertisements) in a limited presentation region (of, for example, a monitor, etc.) of the user terminal 3 that is used by the user. In addition, the communication capacity, i.e. the communication resources, with which the user terminal 3 can use high-speed communication can be effectively utilized.

As explained above in the first example of the user information update process, the state determination unit 1e, which determines that a state in which the remaining communication amount is less than a threshold value is the limit-requiring state, and determines a state in which the remaining communication amount is at or above a threshold value is the normal state, is further provided, and the content selection unit 1c selects the content using the results of the above determination.

The process for comparing the remaining communication amount and the threshold value may be realized by a simple process with a low processing load.

Therefore, the process can be implemented without using a high-performance information processing device.

Further, as explained above regarding the intermediate state determination process, the communication capacity limit management unit 1a manages a period which is shorter than the determination target period as an intermediate determination period, and the state determination unit 1e performs the determination using the threshold value as an intermediate threshold value, which can be calculated from a value obtained by multiplying a ratio of a length of the intermediate determination period relative to a length of the determination target period by the communication capacity limit value, and using the remaining communication amount at an intermediate point at which the intermediate determination period has elapsed from a start of the determination target period.

Due to the above configuration, it is determined whether the state is the limit-requiring state or the normal state by comparing the remaining communication amount and the intermediate threshold value at the time at which the intermediate determination period has elapsed.

In other words, an appropriate determination is made at the intermediate point, and the communication amount can be prevented from exceeding the communication capacity limit value.

Further, as explained above in the second example of the user information update process, the following are further provided: the remaining time calculation unit 1f that calculates the remaining time of the determination target period; the predicted remaining communication amount calculation unit 1g that calculates, on the basis of the communication capacity that is used on average in the user terminal 3, a predicted remaining communication amount at the time of completion of the determination target period; and the state determination unit 1e that determines whether the state is the normal state or the limit-requiring state according to the predicted remaining communication amount.

Due to the above configuration, a predicted remaining communication amount reflecting the individual usage state is calculated on the basis of the average used communication amount for each user terminal 3. The predicted remaining communication amount is a numerical value predicting how much communication will be remaining at the time of completion of the determination target period, and an information amount of a content which can be distributed is estimated based on this numerical value.

Therefore, appropriate content distribution can be performed for each user terminal 3.

In addition, as explained above in the first example of the detailed advertisement distribution process, the communication capacity limit management unit 1a updates, each time the content distribution is performed, information of the communication capacity limit value and the determination target period, using a distribution time, which is a time required for the content distribution, and an information amount of the content.

Due to the above configuration, information of the communication capacity limit value and the determination target period is updated for each content distribution.

Therefore, even if the circumstances of the user have changed, appropriate content distribution in accordance with the change in circumstances can be carried out.

Furthermore, as explained above in the second example of the detailed advertisement distribution process, the content distribution unit 1d does not distribute a content to the user terminal 3 in the limit-requiring state.

Due to the above configuration, in the limit-requiring state, the remaining communication amount is not consumed by a distributed content.

Therefore, the remaining communication amount can be suppressed from reaching the communication capacity limit value due to the distributed content, and a distribution service that is user-friendly for the user can be provided.

Moreover, as explained above in the second example of the detailed advertisement distribution process, the content distribution unit 1d distributes a content to the user terminal 3 even in the limit-requiring state if the user terminal 3 is in a state in which remaining communication amount non-use communication, which does not use the remaining communication amount, is established.

Due to the above configuration, the content is distributed even in the limit-requiring state if the user terminal 3 is in a state in which the remaining communication amount is not used (is not consumed).

Therefore, the communication capacity limit value of the user can be prevented from being used up by content distribution, and a distribution service that is highly convenient for the user can be provided.

In addition, as explained above with regard to the communication plan information acquisition process, the communication capacity limit management unit 1a makes a user using the user terminal 3 input at least one of the communication capacity limit value, a period length of the determination target period, and a start time of the determination target period.

Due to the above configuration, at least one of the communication capacity limit value, a period length of the determination target period, and a start time of the determination target period can be managed as reliable information on the basis of the information input by the user.

Therefore, by obtaining highly accurate information, a service that performs appropriate distribution can be provided. Further, since it becomes unnecessary to estimate at least one of the information units, the processing load of the information processing device can be reduced.

Moreover, as explained above with regard to the content selection process, in the case that a first content (advertisement with images) and a second content (advertisement without images) having a smaller information amount than the first content are provided as contents comprising identical content to be distributed to the user terminal 3, the content selection unit 1c selects the first content in the normal state and selects the second content in the limit-requiring state Due to the above configuration, in the case that two contents of different information amounts are provided as contents comprising identical content, the content is selected according to the remaining communication amount of the user or the like.

Therefore, an appropriate distribution service according to the circumstances of the user can be provided.

In addition, as explained above in the advertisement display mode and the first example of the detailed advertisement distribution process, the content is a content that is displayed on a screen when restoring the user terminal 3, which is a portable terminal in a sleep mode to a normal mode.

Due to the above configuration, the content is displayed on the screen of the portable terminal in a state in which the portable terminal is not being used by a user. Further, the content is definitely viewed when the user uses the portable terminal.

Therefore, content which can be efficiently viewed by the user can be distributed, and content which does not obstruct the normal use state of the portable terminal of the user can be distributed.

With regard to the user terminal 3 as explained above, an example was explained in which the simple advertisement information is stocked in advance, and then the detailed advertisement information is acquired as necessary. However, the detailed advertisement information may be stocked in advance.

For example, in step S104 of FIG. 6, a distribution request for both the simple advertisement information and the detailed advertisement information may be transmitted. The content distribution device 1 which has received the request determines whether the user terminal 3 is in the normal state or the limit-requiring state, and selects, on the basis of this determination, either the advertisement with images or the advertisement without images and transmits the advertisement to the user terminal 3.

If the user terminal 3 is in the limit-requiring state, stocking of the detailed advertisement information may be stopped and stocking of only the simple advertisement information may be performed.

In the above, an advertisement with images was given as an example of the first content, and an advertisement without images was given as an example of the second content, but other examples are also possible.

For example, an advertisement including uncompressed images may be used as the first content, and an advertisement including compressed images may be used as the second content.

In other words, any examples may be used as long as the second content is smaller than the first content in terms of the information amount (data capacity).

In the following, the case in which a prepaid communication plan is used shall be explained.

A prepaid communication plan is a communication plan in which the determination target period does not repeat as explained above, but rather a one-time determination target period is provided.

For example, high-speed communication can be used as long as the communication capacity of "2 Gbytes" is not exceed in "one month", and if the determination target period length of "one month" is exceeded, the communication plan can no longer be used.

Further, there are communication plans in which, when the accumulated communication amount has exceeded "2 Gbytes", the communication becomes low speed or the communication plan can no longer be used.

The effects described above can also be achieved for such prepaid communication plans as well.

In the following, a case will be considered in which a content distribution system comprising the content distribution device 1 and the user terminals 3, 3, . . . is provided with: the communication capacity limit management unit 1a; the remaining communication amount calculation unit 1b; the content selection unit 1c; the content distribution unit 1d; the state determination unit 1e; the remaining time calculation unit 1f; the predicted remaining communication amount calculation unit 1g; and the threshold value setting unit 1h.

In this case, the units provided to the content distribution system may be provided to either one of the content distribution device 1 and the user terminal 3.

For example, if the user terminal 3 is a portable terminal, etc. in which a dedicated application for receiving the advertisement distribution service has been installed, then the communication capacity limit management unit 1a and the remaining communication amount calculation unit 1b are provided to the user terminal 3. Further, the content selection unit 1c and the content distribution unit 1d are provided to the content distribution device 1. Finally, the state determination unit 1e, the remaining time calculation unit 1f, the predicted remaining communication amount calculation unit 1g, and the threshold value setting unit 1h are provided to either one of the content distribution device 1 and the user terminal 3.

In other words, the communication status of the user terminal 3 and the consumption status of the communication plan, etc. are notified from the user terminal 3 to the content distribution device 1, and the content distribution device 1 executes a process for selecting, on the basis of the above information, a content and distributing the content.

The effects described above can also be achieved by such a configuration as well.

Instead of the communication capacity limit management unit 1a, the user terminal 3 may have an information acquisition unit.

Further, the user terminal 3 may also be provided with a selection information transmission unit for transmitting to the content distribution device 1 selection information regarding which of the first content and the second content was selected to be received on the basis of the information such as the communication capacity limit value and the determination target period.

For example, as shown in FIG. 15, the user terminal 3 may be an information processing device including: an information acquisition unit 3a that acquires information of the communication capacity limit value and information of the determination target period which is a period during which a used communication capacity is determined; a remaining communication amount calculation unit 3b that calculates, on the basis of the communication capacity limit value, a remaining communication amount in the determination target period; a selection information transmission unit 3c that transmits selection information for selecting a content according to the remaining communication amount; and a content reception unit 3d that receives the content selected on the basis of the selection information. In FIG. 15, the shop terminals 4 have been omitted.

In this case, the user terminal 3 executes not only the processes of FIG. 6, but also some of the processes among those shown in FIGS. 7 to 10 and 12 to 14.

For example, before performing the detailed advertisement distribution request process in step S109 of FIG. 6, the user terminal 3 performs processes corresponding to the process of step S209 and the process of step S204 of FIG. 8, and thereby the distribution control state is ascertained. Further, the user terminal 3 may determine the distribution control state of the user terminal 3 by performing the processes shown in FIG. 14.

The process for determining the distribution control state of the user terminal 3 may be a determination process using various information (such as the communication capacity limit value and the accumulated communication amount, etc.) related to the communication plan that is stored in the user terminal 3, and also may be a determination process using various information acquired using an API, etc. provided by the company that is providing the communication plan.

After performing the determination of the distribution control state, the user terminal 3 transmits a detailed advertisement distribution request according to the distribution control state to the content distribution device 1.

The content distribution device 1 which has received the detailed advertisement distribution request appropriately executes the processes of steps S203 to S207 shown in FIG. 7, and thereby appropriate detailed advertisement information can be transmitted to the user terminal 3.

Further, appropriate detailed advertisement information may also be transmitted to the user terminal 3 by appropriately executing the processes of steps S203, S204, S206, S207, and S209 shown in FIG. 8.

The content distribution device 1 is notified of the distribution control state of the user terminal 3 when receiving the distribution request for the detailed advertisement information from the user terminal 3. Therefore, the processes in FIGS. 9 and 10 for estimating the distribution control state of the user terminal 3 do not have to be executed.

9. PROGRAM

The program in the above embodiments is a program that causes an arithmetic processing device (a CPU, etc.) of the content distribution device 1 to execute various procedures.

The program causes the arithmetic processing device to execute a communication capacity limit management procedure for managing a communication capacity limit value of a terminal to which a content is to be distributed, and a determination target period which is a period during which a used communication capacity is determined.

Further, the program causes the arithmetic processing device to execute a remaining communication amount calculation procedure for calculating, on the basis of the communication capacity limit value, the remaining communication amount in the determination target period.

In addition, the program causes the arithmetic processing device to execute a content selection procedure for selecting a content to be distributed according to the remaining communication amount.

Moreover, the program causes the arithmetic processing device to execute a content distribution procedure for distributing the selected content to the terminal.

In other words, the program causes the arithmetic processing device to execute the processes explained in FIGS. 7 to 10 and 12 to 14.

The content distribution device 1 of the first embodiment and the second embodiment can be realized by such a program.

Further, such a program can be stored in advance in an HDD which serves as a storage medium built into a device such as a computer device, or in a ROM within a microcomputer having a CPU, or the like. Alternatively, the program can be temporarily or permanently stored (recorded) in a removable storage medium such as a semiconductor memory, a memory card, an optical disk, a magneto-optical disk, and a magnetic disk. Such a removable storage medium can be provided as a so-called package software.

In addition, such a program can be installed from the removable storage medium to a personal computer or the like, or can be downloaded from a download site via a network such as LAN or the internet.

In the case that the user terminal 3 is a mobile telephone, etc. in which a dedicated application has been installed, an arithmetic processing device of the user terminal 3 may be caused to execute: an information acquisition procedure for acquiring information of a communication capacity limit value, and information of a determination target period which is a period during which a used communication capacity is determined; a remaining communication amount calculation procedure for calculating, on the basis of the communication capacity limit value, the remaining communication amount in the determination target period; a selection information transmission procedure for transmitting selection information for selecting a content according to the remaining communication amount; and a content reception procedure for receiving the content selected on the basis of the selection information.

The user terminal 3 for utilizing a content distribution service that takes into account the communication capacity limit value of the communication plan used by the user can be realized by such a program.

REFERENCE SIGNS LIST

1: content distribution device; 1a: communication capacity limit management unit; 1b: remaining communication amount calculation unit; 1c: content selection unit; 1d: content distribution unit; 1e: state determination unit; 1f: remaining time calculation unit; 1g: predicted remaining communication amount calculation unit; 1h: threshold value setting unit; 2: communication network; 3: user terminal; 4: shop terminal; 50: user DB; 51: terminal DB; 52: advertisement DB

The invention claimed is:

1. An information processing device comprising:
   at least one memory configured to store program code;
   at least one processor configured to access said program code and operate as instructed by said program code, said program code including:
   communication capacity limit management code configured to cause at least one of said at least one processor to manage a communication capacity limit value of a terminal to which a content is to be distributed, and a determination target period which is a period during which a used communication capacity is determined;
   remaining communication amount calculation code configured to cause at least one of said at least one processor to calculate, based on the communication capacity limit value, a remaining communication amount in the determination target period;
   content selection code configured to cause at least one of said at least one processor to select a first content, when the remaining communication amount is greater than or equal to a threshold, that has a bigger data size than a second content selected when the remaining communication amount is less than the threshold; and
   content distribution code configured to cause at least one of said at least one processor to distribute the selected content to the terminal, wherein the content distribution code is configured to cause at least one of said at least one processor to distribute the selected content to the terminal when the terminal is identified as not being in a state of using the network communication associated with a data plan and is under a limit-requiring state for which the remaining communication amount is less than the threshold, wherein the selected content is the first content.

2. The information processing device according to claim 1, wherein
   said program code further includes a state determination code configured to cause at least one of said at least one processor to determine a state in which the remaining communication amount is less than a threshold value to be a limit-requiring state, and determines a state in which the remaining communication amount is at or above the threshold value to be a normal state, and the content selection code is configured to cause at least one of said at least one processor to select a content using the result of the determination.

3. The information processing device according to claim 2, wherein, in the limit-requiring state, the content distribution code is configured to cause at least one of said at least one processor to distribute to the terminal a content in which an information amount has been reduced, or not to distribute a content to the terminal.

4. The information processing device according to claim 1, wherein the communication capacity limit management code is configured to cause at least one of said at least one processor to make a user using the terminal input at least one of the communication capacity limit value, a period length of the determination target period, and a start time of the determination target period.

5. The information processing device according to claim 2, wherein in the case that the first content and the second content having a smaller information amount than the first content are provided as contents comprising identical content to be distributed to the terminal, the content selection code is configured to cause at least one of said at least one processor to select the first content in the normal state and select the second content in the limit-requiring state.

6. The information processing device according to claim 1, wherein the first content or the second content is a content that is displayed on a screen when restoring the terminal in a sleep mode to a normal mode.

7. An information processing device comprising:
at least one memory configured to store program code;
at least one processor configured to access said program code and operate as instructed by said program code, said program code including:
communication capacity limit management code configured to cause at least one of said at least one processor to manage a communication capacity limit value of a terminal to which a content is to be distributed, and a determination target period which is a period during which a used communication capacity is determined;
remaining communication amount calculation code configured to cause at least one of said at least one processor to calculate, on the basis of the communication capacity limit value, a remaining communication amount in the determination target period;
content selection code configured to cause at least one of said at least one processor to select a first content, when the remaining communication amount is greater than or equal to a threshold, that has a bigger data size than a second content selected when the remaining communication amount is less than the threshold;
content distribution code configured to cause at least one of said at least one processor to distribute the selected content to the terminal; and
state determination code configured to cause at least one of said at least one processor to determine a state in which the remaining communication amount is less than a threshold value to be a limit-requiring state, and determine a state in which the remaining communication amount is at or above the threshold value to be a normal state, wherein the content selection code is configured to cause at least one of said at least one processor to select the selected content using the result of the determination, the communication capacity limit management code is configured to cause at least one of said at least one processor to manage a period shorter than the determination target period as an intermediate determination period, and the state determination code is configured to cause at least one of said at least one processor to perform the determination using the threshold value as an intermediate threshold value, which can be calculated from a value obtained by multiplying a ratio of the length of the intermediate determination period relative to the length of the determination target period by the communication capacity limit value, and using the remaining communication amount at an intermediate point at which the intermediate determination period has elapsed from the start of the determination target period.

8. An information processing device comprising:
at least one memory configured to store program code;
at least one processor configured to access said program code and operate as instructed by said program code, said program code including:
communication capacity limit management code configured to cause at least one of said at least one processor to manage a communication capacity limit value of a terminal to which a content is to be distributed, and a determination target period which is a period during which a used communication capacity is determined ;
remaining communication amount calculation code configured to cause at least one of said at least one processor to calculate, on the basis of the communication capacity limit value, a remaining communication amount in the determination target period;
content selection code configured to cause at least one of said at least one processor to select a a first content, when the remaining communication amount is greater than or equal to a threshold, that has a bigger data size than a second content selected when the remaining communication amount is less than the threshold;
content distribution code configured to cause at least one of said at least one processor to distribute the selected content to the terminal;
remaining time calculation code configured to cause at least one of said at least one processor to calculate a remaining time of the determination target period;
predicted remaining communication amount calculation code configured to cause at least one of said at least one processor to calculate, on the basis of a record of a communication capacity that was used in the terminal, a predicted remaining communication amount at the time of completion of the determination target period; and
state determination code configured to cause at least one of said at least one processor to determine a normal state and a limit-requiring state according to the predicted remaining communication amount.

9. An information processing device comprising:
at least one memory configured to store program code;
at least one processor configured to access said program code and operate as instructed by said program code, said program code including:
communication capacity limit management code configured to cause at least one of said at least one processor to manage a communication capacity limit value of a terminal to which a content is to be distributed, and a determination target period which is a period during which a used communication capacity is determined;

remaining communication amount calculation code configured to cause at least one of said at least one processor to calculate, on the basis of the communication capacity limit value, a remaining communication amount in the determination target period;

content selection code configured to cause at least one of said at least one processor to select a first content, when the remaining communication amount is greater than or equal to a threshold, that has a bigger data size than a second content selected when the remaining communication amount is less than the threshold; and content distribution code configured to cause at least one of said at least one processor to distribute the selected content to the terminal, wherein the communication capacity limit management code is configured to cause at least one of said at least one processor to update, each time the content distribution is performed, information of the communication capacity limit value and the determination target period using a distribution time, which is a time required for the content distribution, and an information amount of the selected content.

10. An information processing method comprising:

managing a communication capacity limit value of a terminal to which a content is to be distributed, and a determination target period which is a period during which a used communication capacity is determined;

calculating, on the basis of the communication capacity limit value, a remaining communication amount in the determination target period;

selecting a first content, when the remaining communication amount is greater than or equal to a threshold, that has a bigger data size than a second content selected when the remaining communication amount is less than the threshold;

distributing the selected content to the terminal, distributing the selected content to the terminal when the terminal is identified as not being in a state of using the network communication associated with a data plan and is under a limit-requiring state for which the remaining communication amount is less than the threshold, wherein the selected content is the first content.

11. An information processing system comprising a server and a terminal, the information processing system further comprising:

a communication capacity limit management unit configured to manage a communication capacity limit value of a terminal to which a content is to be distributed, and a determination target period which is a period during which a used communication capacity is determined;

a remaining communication amount calculation unit configured to calculate, on the basis of the communication capacity limit value, a remaining communication amount in the determination target period;

a content selection unit configured to select a first content, when the remaining communication amount is greater than or equal to a threshold, that has a bigger data size than a second content selected when the remaining communication amount is less than the threshold; and a content distribution unit configured to distribute the selected content to the terminal, wherein the content distribution unit distributes the selected content to the terminal when the terminal is identified as not being in a state of using the network communication associated with a data plan and is under a limit-requiring state for which the remaining communication amount is less than the threshold, wherein the selected content is the first content.

12. An information processing device comprising:

at least one memory configured to store program code;

at least one processor configured to access said program code and operate as instructed by said program code, said program code including:

information acquisition code configured to cause at least one of said at least one processor to acquire information of a communication capacity limit value and information of a determination target period, which is a period during which a used communication capacity is determined;

remaining communication amount calculation code configured to cause at least one of said at least one processor to calculate, on the basis of the communication capacity limit value, a remaining communication amount in the determination target period;

selection information transmission code configured to cause at least one of said at least one processor to transmit selection information for selecting a first content, when the remaining communication amount is greater than or equal to a threshold, that has a bigger data size than a second content selected when the remaining communication amount is less than the threshold; and content reception code configured to cause at least one of said at least one processor to receive the content selected on the basis of the selection information, wherein the content reception code is configured to cause at least one of said at least one processor to receive the content when the terminal is identified as not being in a state of using the network communication associated with a data plan and is under a limit-requiring state for which the remaining communication amount is less than the threshold, wherein the selected content is the first content.

13. An information processing method comprising:

acquiring information of a communication capacity limit value and information of a determination target period, which is a period during which a used communication capacity is determined;

calculating, on the basis of the communication capacity limit value, a remaining communication amount in the determination target period;

transmitting selection information for selecting a first content, when the remaining communication amount is greater than or equal to a threshold, that has a bigger data size than a second content selected when the remaining communication amount is less than the threshold; and receiving the content selected on the basis of the selection information.

receiving the selected content when the terminal is identified as not being in a state of using the network communication associated with a data plan and is under a limit-requiring state for which the remaining communication amount is less than the threshold, wherein the selected content is the first content.

* * * * *